(12) United States Patent
Lee et al.

(10) Patent No.: US 7,301,927 B2
(45) Date of Patent: Nov. 27, 2007

(54) APPARATUS AND METHOD FOR MULTIMEDIA BROADCAST/MULTICAST SERVICE IN A MOBILE COMMUNICATION SYSTEM

(75) Inventors: Kook-Heui Lee, Songnam-shi (KR); Sung-Ho Choi, Songnam-shi (KR); Soeng-Hun Kim, Suwon-shi (KR); Joon-Goo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 941 days.

(21) Appl. No.: 10/428,631

(22) Filed: May 2, 2003

(65) Prior Publication Data

US 2004/0008657 A1  Jan. 15, 2004

(30) Foreign Application Priority Data

May 3, 2002   (KR) ................. 10-2002-0025406
Jun. 21, 2002 (KR) ................. 10-2002-0035818

(51) Int. Cl.
 *H04Q 7/24* (2006.01)
(52) U.S. Cl. ............... 370/338; 370/328; 370/352; 455/412.1; 455/515; 709/206
(58) Field of Classification Search ............. 370/338, 370/352, 328; 455/412.1, 515; 709/206, 709/228
See application file for complete search history.

(56) References Cited

U.S. PATENT DOCUMENTS

| 2001/0005675 | A1* | 6/2001 | Aho ............................... 455/412 |
| 2001/0034767 | A1* | 10/2001 | Aho ............................ 709/206 |
| 2002/0131395 | A1* | 9/2002 | Wang .......................... 370/349 |
| 2003/0108015 | A1* | 6/2003 | Li ................................ 370/338 |
| 2003/0134653 | A1* | 7/2003 | Sarkkinen et al. .......... 455/517 |
| 2003/0174645 | A1* | 9/2003 | Paratainen et al. ......... 370/229 |
| 2003/0208628 | A1* | 11/2003 | Karjanlahti ................. 709/249 |

OTHER PUBLICATIONS

European Search Report dated Sep. 8, 2003 issued in a counterpart application, namely, Appln. No. 03010142.2.
3rd Generation Partnership Project; Technical Specification Group Services and System Aspects; Multimedia Broadcast/Multicast Service; Architecture and Functional Description, Apr. 25, 2002.
Universal Mobile Telecommunication System (UMTS); Multimedia Broadcast/Multicast Service (MBMS); Stage 1, Mar. 1, 2002.
"MBMS With Iu-Flex", May 6, 2002.

* cited by examiner

*Primary Examiner*—Danh Le
(74) *Attorney, Agent, or Firm*—The Farrell Law Firm

(57) ABSTRACT

A method and apparatus for providing an MBMS (Multimedia Broadcast/Multicast Service) service to user equipments (UEs) that desire to receive the MBMS service, in a code division multiple access (CDMA) mobile communication system including a plurality of radio network controllers (RNCs), a plurality of SGSNs (Serving GPRS (General Packet Radio Service) Supporting Nodes) connected to each of the RNCs, and a plurality of the UEs wirelessly connectable to the RNCs, and providing the MBMS service to the UEs. The UEs request a desired MBMS service, and receive an MBMS service provided in response to the request. The RNCs transmit data related to the MBSM service to UEs wirelessly connected to thereto among UEs that requested the service. The SGSNs control a procedure related to the MBMS service for the UEs that requested the service. A default SGSN is individually designated for the MBMS service, and the default SGSN transmits MBMS data for the given MBMS service to UEs that requested the given MBMS service, through the RNCs.

21 Claims, 19 Drawing Sheets

APPARATUS AND METHOD FOR MULTIMEDIA BROADCAST/MULTICAST SERVICE IN A MOBILE COMMUNICATION SYSTEM

PRIORITY

This application claims priority under 35 U.S.C. § 119 to an application entitled "Apparatus and Method for Multimedia Broadcast/Multicast Service in a Mobile Communication System" filed in the Korean Intellectual Property Office on May 3, 2002 and assigned Serial No. 2002-25406 and "Apparatus and Method for Multimedia Broadcast/Multicast Service in a Mobile Communication System" filed in the Korean Intellectual Property Office on Jun. 21, 2002 and assigned Serial No. 2002-35818, the contents of which are incorporated herein by referenced.

BACKGROUND OF THE INVENTION

1. Field of the Invention

The present invention relates generally to an apparatus and method for setting up a channel for a multimedia broadcast/multicast service in a mobile communication system, and in particular, to an apparatus and method for setting up a channel in response to a multimedia broadcast/multicast service request.

2. Description of the Related Art

Currently, due to the development of the communication industry, a service provided by a code division multiple access (hereinafter referred to as "CDMA") mobile communication system is being developed into multicasting multimedia communication that transmits voice service data and high-capacity data such as packet data and circuit data. In order to support the multicasting multimedia communication, a broadcast/multicast service is required in which one data source provides a service to a plurality of user equipments (hereinafter referred to as "UE"). The broadcast/multicast service can be divided into a cell broadcast service (hereinafter referred to as "CBS"), being a message-based service, and a multimedia broadcast/multicast service (hereinafter referred to as "MBMS") that supports multimedia data, such as real-time image and voice, still image, and text.

The CBS is a service for broadcasting a plurality of messages to all UEs located in a particular service area. The particular service area where the CBS is provided can be the entire area where the CBS is provided in one cell. The MBMS is a service for simultaneously providing voice data and image data, and requires many transmission resources. The MBMS is serviced over a broadcast channel, since a plurality of services can be provided at the same time within one cell.

As stated above, in the conventional mobile communication system, when the same MBMS request is received from a plurality of UEs controlled by the, same cell or radio network controller (hereinafter referred to as "RNC"), channels, or MBMS data transmission paths, in the system must be separately assigned in response to each request from the UEs.

Therefore, the conventional mobile communication system requires a signaling procedure for providing the same MBMS service to the plurality of UEs. However, if a plurality of channels (or MBMS data transmission paths) are assigned to provide the same MBMS service to different UEs, resources may be wasted unnecessarily and the signaling procedure may be complicated.

SUMMARY OF THE INVENTION

It is, therefore, an object of the present invention to provide an apparatus and method for efficiently assigning resources to a plurality of UEs that request the same MBMS service in a mobile communication system.

It is another object of the present invention to provide an apparatus and method for assigning a minimized number of data transmission paths to UEs that request the same MBMS service in a mobile communication system.

It is further another object of the present invention to provide an apparatus and method for simplifying a signaling procedure for channel assignment by managing channels according to UEs that receive a specific MBMS service.

It is yet another object of the present invention to provide an apparatus and method for managing information generated due to a specific MBMS service by one RNC.

It is still another object of the present invention to provide an apparatus and method for managing information generated due to a specific MBMS service by one SGSN (Serving GPRS (General Packet Radio Service) Supporting Node).

In accordance with a first aspect of the present invention, there is provided an apparatus for providing a MBMS (Multimedia Broadcast/Multicast Service) service to user equipments (UEs) requesting the MBMS service, in a code division multiple access (CDMA) mobile communication system including a plurality of radio network controllers (RNCs), a plurality of SGSNs (Serving GPRS (General Packet Radio Service) Supporting Nodes) connected to each of the RNCs, and a plurality of the UEs wirelessly connectable to the RNCs, and providing the MBMS service to the UEs. In the apparatus, the UEs request a desired MBMS service, and receive an MBMS service provided in response to the request. The RNCs transmit data related to the MBSM service to UEs wirelessly connected to thereto among UEs that requested the service. The SGSNs control a procedure related to the MBMS service for the UEs that requested the service. A default SGSN is individually designated for the MBMS service, and the default SGSN transmits MBMS data for the MBMS service to the UEs that requested the MBMS service, through the RNCs.

In accordance with a second aspect of the present invention, there is provided a method for determining a default SGSN (Serving GPRS (General Packet Radio Service) Supporting Node) for providing an MBMS (Multimedia Broadcast/Multicast Service) service to user equipments (UEs) requesting the MBMS service, in a code division multiple access (CDMA) mobile communication system having a first group including a plurality of radio network controllers (RNCs), a second group including a plurality of SGSNs connectable to each of the RNCs in the first group, and a plurality of the UEs wirelessly connectable to the RNCs. The method comprising the steps of receiving, by one of the RNCs, a service request for the MBMS service; if default SGSN information corresponding to the MBMS service is not stored in the service request-received RNC, selecting, by the service request-received RNC, one of the SGSNs as a default SGSN; and informing, by the selected default SGSN, all other RNCs except for the service request-received RNC that the MBMS service is managed by the default SGSN.

In accordance with a third aspect of the present invention, there is provided a method for determining a default SGSN (Serving GPRS (General Packet Radio Service) Supporting Node) for providing an MBMS (Multimedia Broadcast/Multicast Service) service to user equipments (UEs) requesting the MBMS service, in a code division multiple access (CDMA) mobile communication system having a first group including a plurality of radio network controllers (RNCs), a second group including a plurality of SGSNs connectable to each of the RNCs in the first group, and a plurality of the UEs wirelessly connectable to the RNCs. The method comprising the steps of receiving, by one of the SGSNs, a service request for the MBMS service; if default SGSN information corresponding to the MBMS service is not stored in the service request-received SGSN, selecting, by the service request-received SGSN, itself as a default SGSN; and informing, by the selected default SGSN, other SGSNs that the MBMS service is managed by the default SGSN.

In accordance with a fourth aspect of the present invention, there is provided a method for providing an MBMS (Multimedia Broadcast/Multicast Service) service through one of a plurality of SGSNs (Serving GPRS (General Packet Radio Service) Supporting Nodes), in a code division multiple access (CDMA) mobile communication system including a plurality of radio network controllers (RNCs), a plurality of the SGSNs connected to each of the RNCs, and a plurality of UEs wirelessly connectable to the RNCs, and providing the MBMS service to the UEs. The method comprising the steps of designating, by an RNC that received a service request for the MBMS service among the RNCs, a particular one of the SGSNs as a default SGSN considering a load of each of the SGSNs; transmitting an identifier for identifying the MBMS service and an identifier for identifying the default SGSN to the default SGSN; and determining by the default SGSN whether the MBMS service is available, and transmitting the identifier for identifying the MBMS service and the identifier for identifying the default SGSN to all other RNCs except for the RNC that received the service request for the MBMS service.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
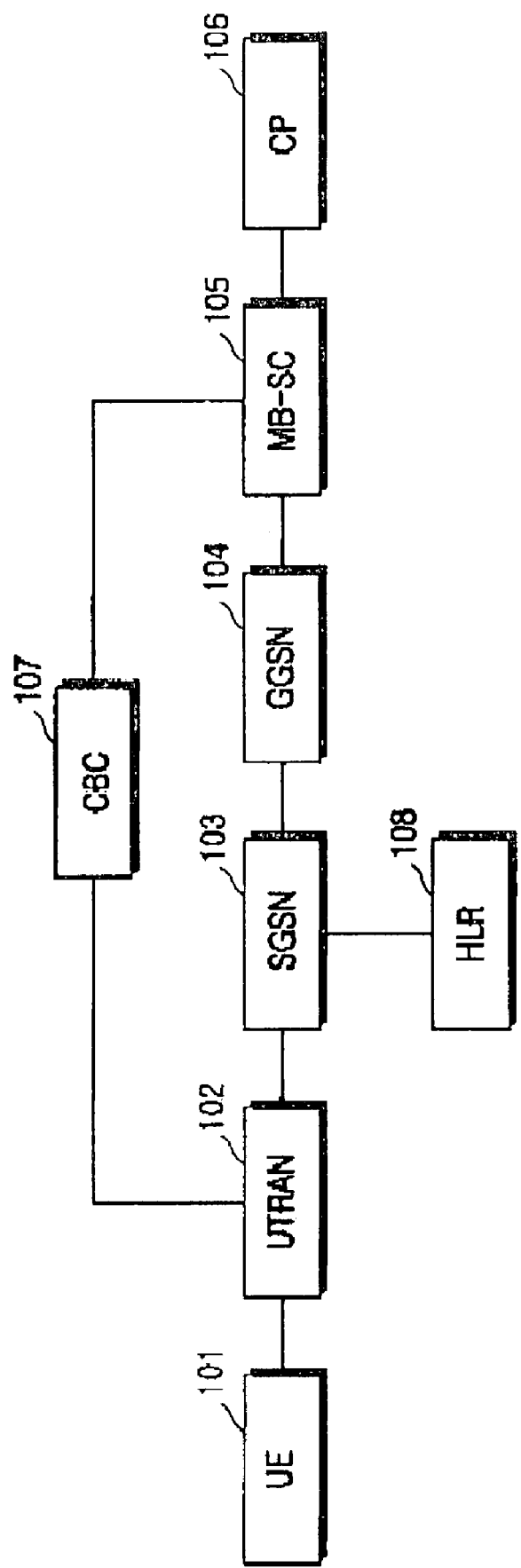
FIG. 1 conceptually illustrates a CDMA mobile communication system supporting for an MBMS service according to an embodiment of the present invention.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

First, a definition of the terms used in embodiments of the present invention will be given herein below. The term "MBMS data" refers to data for an MBMS service provided from a service provider to UEs, and the term "SGSN" refers to a particular SGSN that manages information on a specific MBMS service, among SGSNs classified into the same group.

FIG. 1 illustrates a fundamental structure of a mobile communication system to which embodiments of the present invention are to be applied. Specifically, FIG. 1 illustrates fundamental elements for providing an MBMS service and a relationship among them in a CDMA mobile communication system.

Referring to FIG. 1, a UE 101 is a subscriber device that can receive MBMS data provided for an MBMS service. A UTRAN (UMTS (Universal Mobile Telecommunications System) Terrestrial Radio Access Network) 102 is a device for transmitting MBMS service-related data to the UE 101, and consists of an RNC (Radio Network Controller) and a Node B (not shown). An SGSN (Serving GPRS (General Packet Radio Service) Supporting Node) 103 controls an MBMS service-related procedure of each UE. Typically, the SGSN 103 manages accounting data of each UE, and selectively transmits MBMS data to a particular UTRAN. A GGSN (Gateway GPRS Support Node) 104 selectively transmits MBMS data of CP (content provider) 106 received from an MB-SC 105 to a particular SGSN, and manages accounting data of all UEs that received the MBMS data. The MB-SC 105 represents a source of the MBMS data, and manages scheduling of the MBMS data. Also, the MB-SC 105 authenticates an MBMS data provider, for an MBMS service to the UEs. A cell broadcast center (hereinafter referred to as "CBC") 107 informs the UEs of a menu related to an ongoing MBMS service or information on an MBMS service scheduled to be serviced later. The MBMS service to be serviced later refers to an MBMS service that cannot be currently serviced for the reason that a service or resources provided in a mobile communication system cannot be assigned, but can be serviced later at a time when resources can be assigned. A home location register (hereinafter referred to as "HLR") 108 stores secret data of registered UEs, and authenticates a UE requesting a communication service, or a UE requesting MBMS data.

Figure 2:
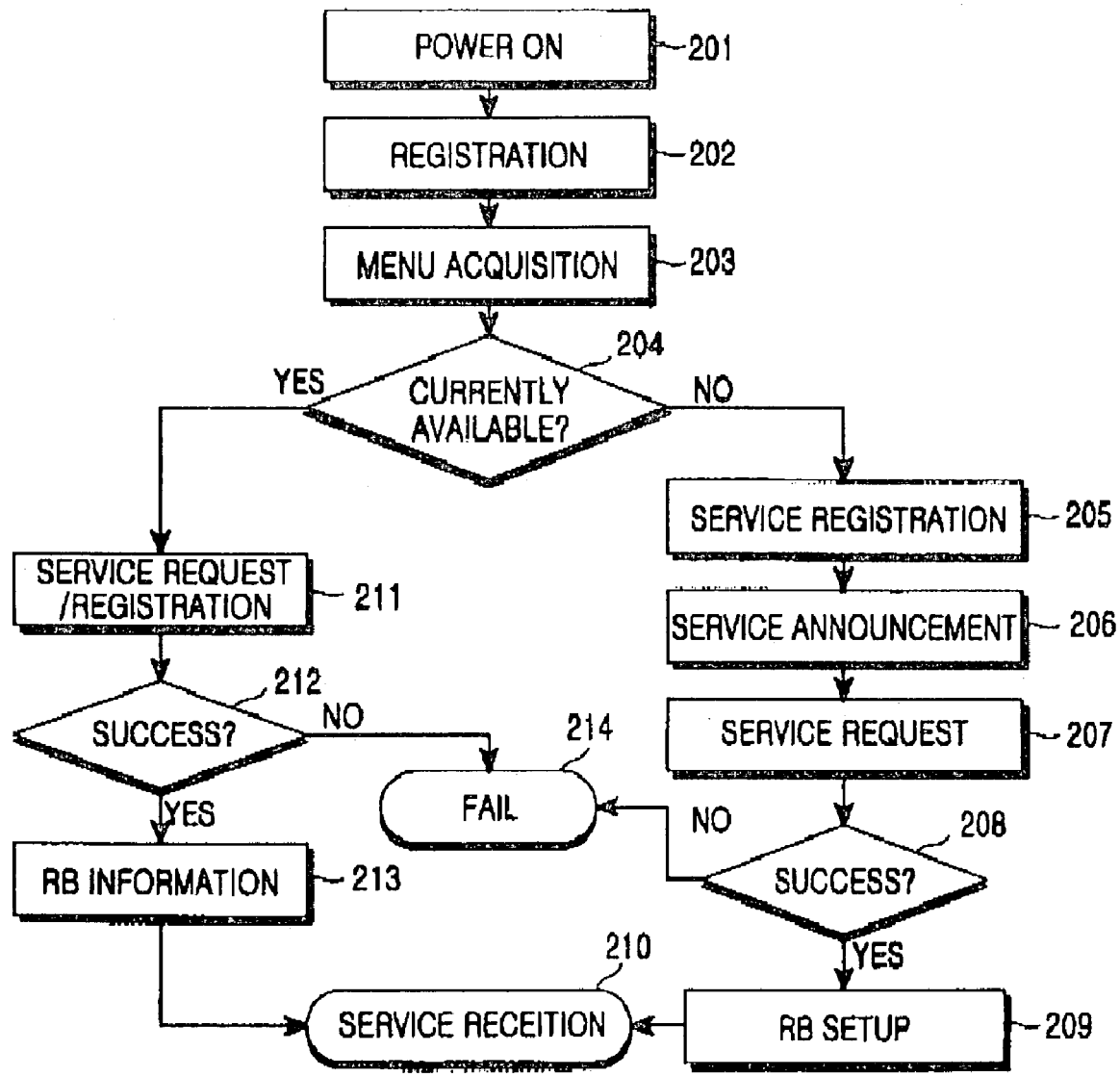
FIG. 2 is a flowchart illustrating a procedure for setting up a transmission path according to an MBMS service.

FIG. 2 is a flowchart illustrating a procedure for assigning channels by each UE to receive an MBMS service from a mobile communication system. That is, FIG. 2 illustrates a procedure for powering a UE in a particular cell and then setting up a channel for receiving MBMS data based on the roles of the elements illustrated in FIG. 1 and a relationship among them. As illustrated in FIG. 2, the procedure for setting up a channel for transmitting MBMS data is divided into two procedures according to a characteristic of an MBMS service selected by the UE. Herein, the term "characteristic of an MBMS service" refers to a currently available MBMS service or an MBMS service to be serviced later.

Figure 3:
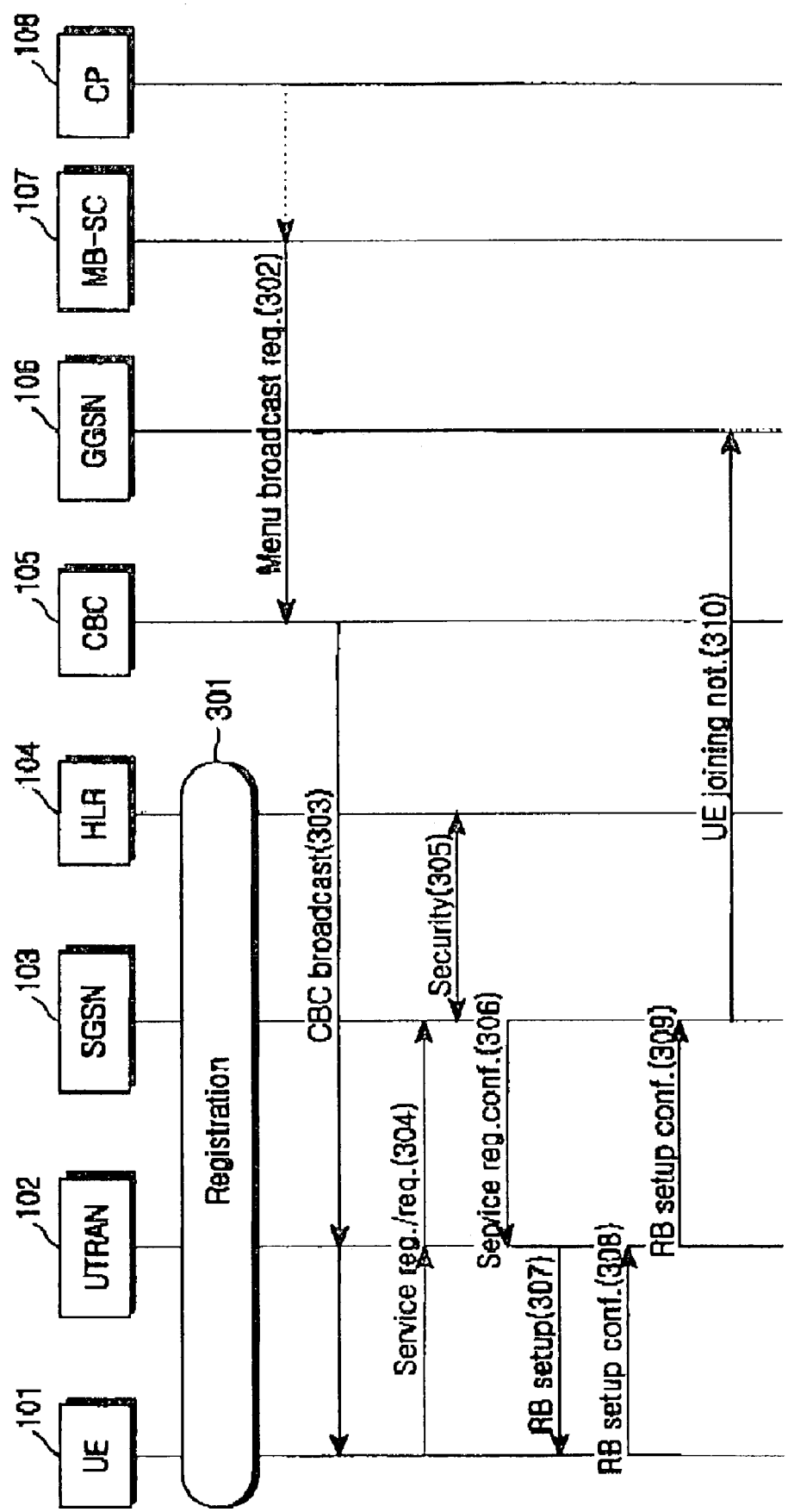
FIG. 3 is a ladder diagram illustrating a signaling procedure for assigning a transmission path according to a MBMS service currently in service.

First, a description will be made of a procedure for receiving by a UE a parameter for receiving MBMS data for a selected MBMS service when the MBMS service selected by the UE is currently provided by a mobile communication system. FIG. 3 illustrates a signaling procedure for receiving, by the UE 101, MBMS data currently provided by the mobile communication system. Herein, the parameter for receiving MBMS data may include physical channel-related information and transport channel-related information. If a corresponding MBMS service is enciphered before being transmitted, the parameter may also include information needed to decipher the MBMS data.

Referring to FIGS. 2 and 3, if power of the UE 101 is turned on in step 201, the UE 101 performs registration (or initial registration) into a particular cell in step 202. For the registration into a particular cell, the UE 101 can use the existing registration procedure. That is, the UE 101 establishes RRC (Radio Resource Control) connection with the UTRAN 102, and then transmits its own IMSI (International Mobile Subscriber Identifier) value to the SGSN 103, using a NAS (Non-Access Stratum) message. The SGSN 103 then requests the HLR 108 to authenticate whether the UE that performs the initial registration is a previously registered UE.

In step 203, the UE 101 acquires information on the type of an MBMS service that is currently being serviced in a cell, or scheduled to be serviced later. At this moment, the CBC 107 can be used to broadcast the MBMS service-related information. An example of a signaling procedure for broadcasting MBMS service-related information by the CBC 107 can be represented by steps 302 and 303 of FIG. 3. In step 204, the UE 101 selects its desired MBMS service based on the received MBMS service-related information. In addition, the UE 101 determines whether the selected MBMS service is currently available or scheduled to be serviced later. If the selected MBMS service is currently being serviced, the UE 101 can receive desired MBMS data through steps 211 to 213. In step 211, the UE 101 provides the UTRAN 102 with information on the type of its desired MBMS service and information necessary for authentication. The UTRAN 102 then determines whether it can provide the MBMS service selected by the UE 101, based on the information received from the UE 101. The elements participating in this step and an example of a signaling procedure among them are represented by steps 304 and 305 of FIG. 3. In step 304, the UE 101 transmits an identifier of the selected MBMS service and its own unique identifier (e.g., IMSI) to the SGSN 103. The SGSN 103 then inquires from the HLR 108, in step 305, about whether authentication of the UE 101 and reception of the selected MBMS service are possible. In step 212, the UE 101 determines whether the authentication was successfully performed. If the UE 101 has a right to receive the selected MBMS service, it proceeds to step 213. The UTRAN 102 then transmits, to the UE 101, information for transmitting the selected MBMS data. In this case, an example of an expected signaling procedure between the UTRAN 102 and the UE 101 is represented by steps 306, 307, 308, 309, and 310 of FIG. 3. If the SGSN 103 informs the UTRAN 102 that authentication of the UE 101 was successfully completed in step 306, the UTRAN 102 provides the UE 101 with information needed to receive the selected MBMS data in step 307. After successfully setting up a channel based on the information necessary for receiving the selected MBMS data, the UE 101 reports the result information to the UTRAN 102 in step 308. In step 309, the UTRAN 102 transmits again the result information to the SGSN 103. In step 310, the SGSN 103 informs the GGSN 104 that a particular UE has started receiving the corresponding MBMS data. As the step 310 is to transmit fundamental accounting data corresponding to receipt of an MBMS service, it can be omitted according to an accounting system. For example, when the accounting-related data of UEs is managed by the SGSN 103, the step 310 can be omitted. Alternatively, the step 310 may be performed after the service is ended. However, when an MBMS service request is failed because the UE 101 cannot receive the selected MBMS data, the UTRAN 102 can refuse to provide the selected MBMS service.

Next, a description will be made of a procedure for setting up a channel for an MBMS service when an MBMS service selected by a UE is scheduled to be provided later. In this case, MBMS service-related elements and an expected signaling procedure among them are illustrated in FIG. 4.

Figure 4:
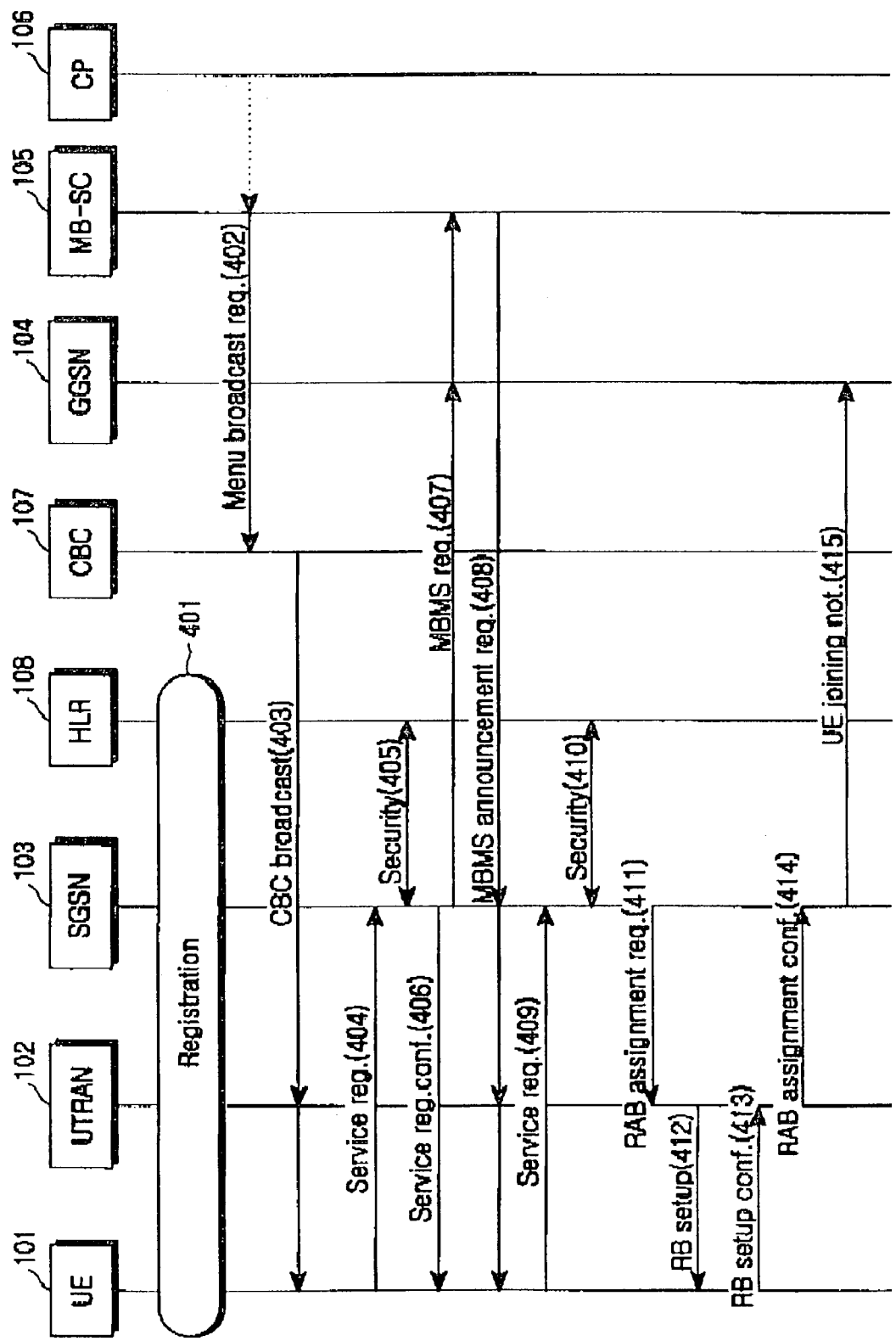
FIG. 4 is a ladder diagram illustrating a signaling procedure for assigning a transmission path according to an MBMS service scheduled to be serviced later.

Referring to FIGS. 2 and 4, if the UE 101 determines in step 204 that the MBMS data selected by the UE 101 itself will be provided later, it proceeds to step 205. In step 205, the UE 101 can previously register receipt of a corresponding service. At this moment, an expected signaling procedure can be represented by steps 404, 405, and 406 of FIG. 4. In step 404, the UE 101 transmits an identifier of the selected MBMS service and its own unique UE identifier to the SGSN 103. The UE identifier can include an IMSI, a P-TMSI (Packet-Temporary Mobile Station Identity), or an RNTI (Radio Network Temporary Identity). P-TMSI is a UE identifier assigned by a packet network, or an SGSN, while TMSI is a UE identifier assigned by a circuit network, or an MSC. The SGSN 103 then inquires from the HLR 108, in step 405, about whether the corresponding UE 101 can receive the selected MBMS data. If the UE 101 can receive the selected MBMS data, the SGSN 103 informs the UE of a success in service registration in step 406. In this case, the SGSN 103 may assign TMGI (Temporary Multicast Group Identity), a UE identifier assigned in common to the selected MBMS service. In step 407, the SGSN 103 informs the GGSN 104 that a request for an MBMS service selected in the UTRAN 102 managed by the SGSN 103 was received. The GGSN 104 transmits again the information provided from the SGSN 103 to the MB-SC 105. In the step stated above, a path for a corresponding MBMS service may be established between the MB-SC (MBMS source) 105 and the SGSN 103.

In step 206, the UE 101 can be previously informed by related elements that the selected MBMS data will be provided before long. How long ago the information should be previously provided by the elements before actual MBMS data will be provided can be realized in different methods. An example of a signaling procedure that can be used in step 206 is represented by step 408 of FIG. 4. In step 408, the MB-SC 105 determines providing of selected MBMS data through scheduling, and then announces the result to the corresponding SGSN 103. The SGSN 103 then announces the result to related UEs trough the UTRAN 102. As a method of announcing by the SGSN 103 the start of a corresponding MBMS service to the related UEs, a paging procedure previously defined in an existing asynchronous CDMA mobile communication system can be used.

After previously perceiving the start of the selected MBMS service through step 206, the UE 101 reaffirms reception of the corresponding MBMS data in step 207. This is because even a UE that previously requested an MBMS service may not receive MBMS data according to circumstances. The UTRAN 102 may re-identify the UE 101 that requested reception of corresponding MBMS data. This corresponds to steps 409 and 410 of FIG. 4. In step 409, the UE 101 can transmit its own unique identifier, TMGI, or MBMS identifier.

In step 208, the UE 101 determines whether the UE identification was successfully achieved. If it is determined that the UE identification was successfully accomplished, the UE 101 performs a procedure for setting up a channel for providing an MBMS service between the UTRAN 102 and the UE 101, and between the UTRAN 102 and the SGSN 103 in step 209. Steps 411, 412, 413 and 414 of FIG. 4 show an example of creating related channels by using a procedure previously defined in the existing asynchronous CDMA mobile communication system.

In step 415, the SGSN 103 informs the GGSN 104 that the corresponding UE 101 receives MBMS data. As the step 415, like the step 310 of FIG. 3, is to transmit fundamental accounting data corresponding to receipt of the MBMS service, it can be omitted according to an accounting system. Alternatively, the step 415 may be performed after the service is ended.

Above, the present invention has been described on the assumption that a mobile communication system includes one UTRAN and one SGSN. However, the invention can also be applied to a mobile communication system including a plurality of UTRANs and SGSNs. In the following description, reference will be made to a method for setting up a transmission path for an MBMS service in the mobile communication system including a plurality of UTRANs and SGSNs. Further, in the following description, Iu-Flex is introduced to divide a plurality of RANs (Radio Access Networks) into a predetermined number of groups and define the groups using the term "CS pool-area" or "PS pool-area."

Figure 5:
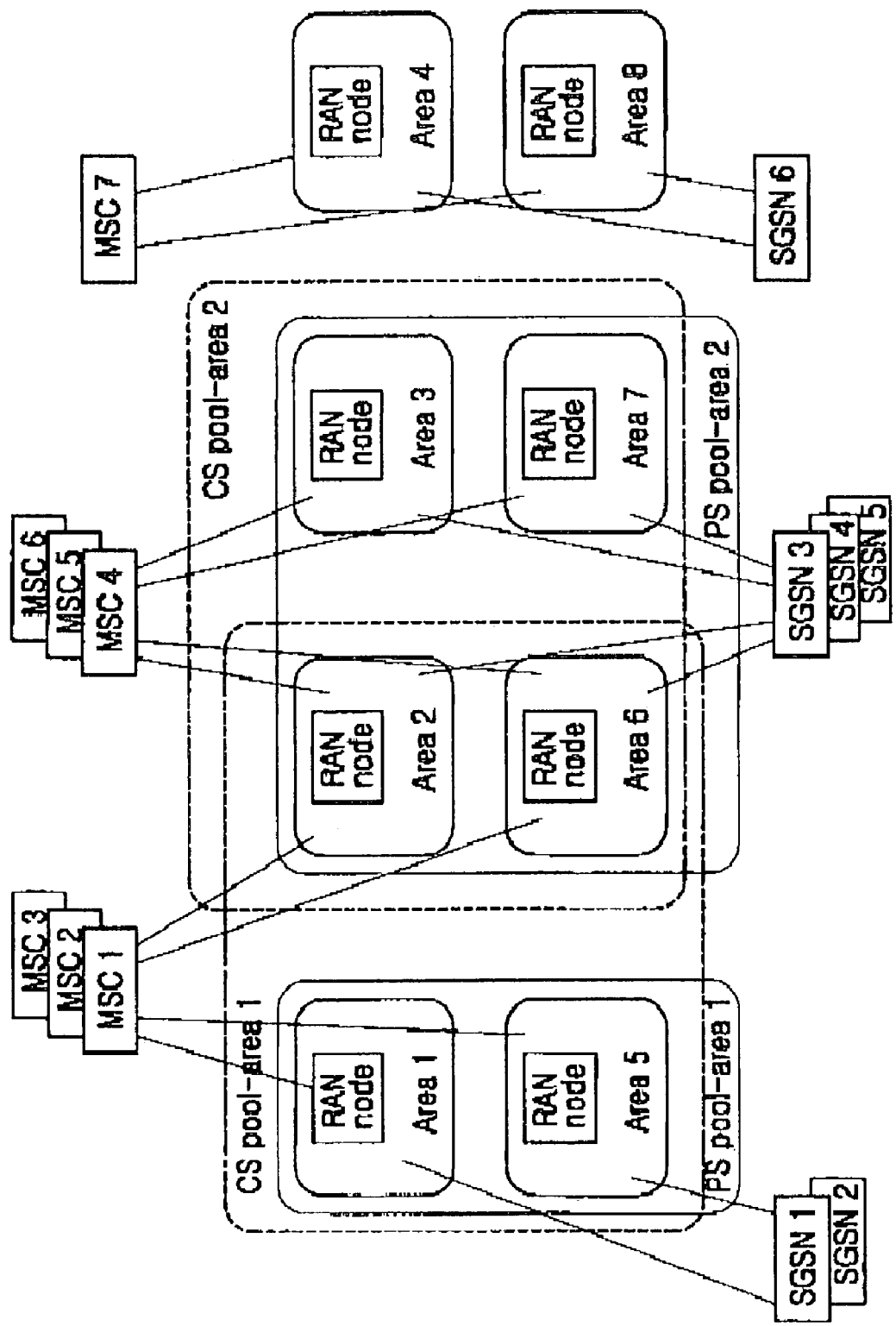
FIG. 5 conceptually illustrates a structure of a mobile communication system with a lu-Flex structure to which the present invention is to be applied.

FIG. 5 illustrates the connection between RNCs and a fixed network when the Iu-Flex is applied. In FIG. 5, paths between RNCs and MSCs (Mobile Switching Centers) are for a circuit-based service, while paths between the RNCs and SGSNs are for a packet-based service. Because the present invention is related to transmission of MBMS data, a description of the invention will be focused on signaling transmission between the RNCs and the SGSNs.

Referring to FIG. 5, when the concept of Iu-Flex is introduced, a plurality of RNCs can be connected to a fixed network via a plurality of SGSNs (or MSCs). The RNCs managed in common by the SGSNs are called a "PS pool-area," while the RNCs managed in common by the MSCs are called a "CS pool-area." Herein, devices located in the same hierarchical position as the MSC and the SGSN are called a "core network (CN)." Each SGSN (or MSC) has NRI (Network Resource Identifier), its own unique identifier assigned thereto. The NRI becomes a part of P-TMSI (or TMSI), a temporary identifier assigned to a UE. That is, when the RNCs should set up connection with a fixed network in order to provide a particular packet-based (or circuit-based) service to a UE, connection between the RNCs and a particular SGSN (or MSC) is set up based on NRI included in the P-TMSI (or TMSI) assigned to the UE. If the UE fails to be assigned P-TMSI (or TMSI), like in an initial registration process, the RNC sets up connection with a particular SGSN (or MSC) considering a load of the SGSN (or MSC). The corresponding SGSN (or MSC) assigns P-TMSI (or TMSI) with its own NRI to the UE.

Figure 6:
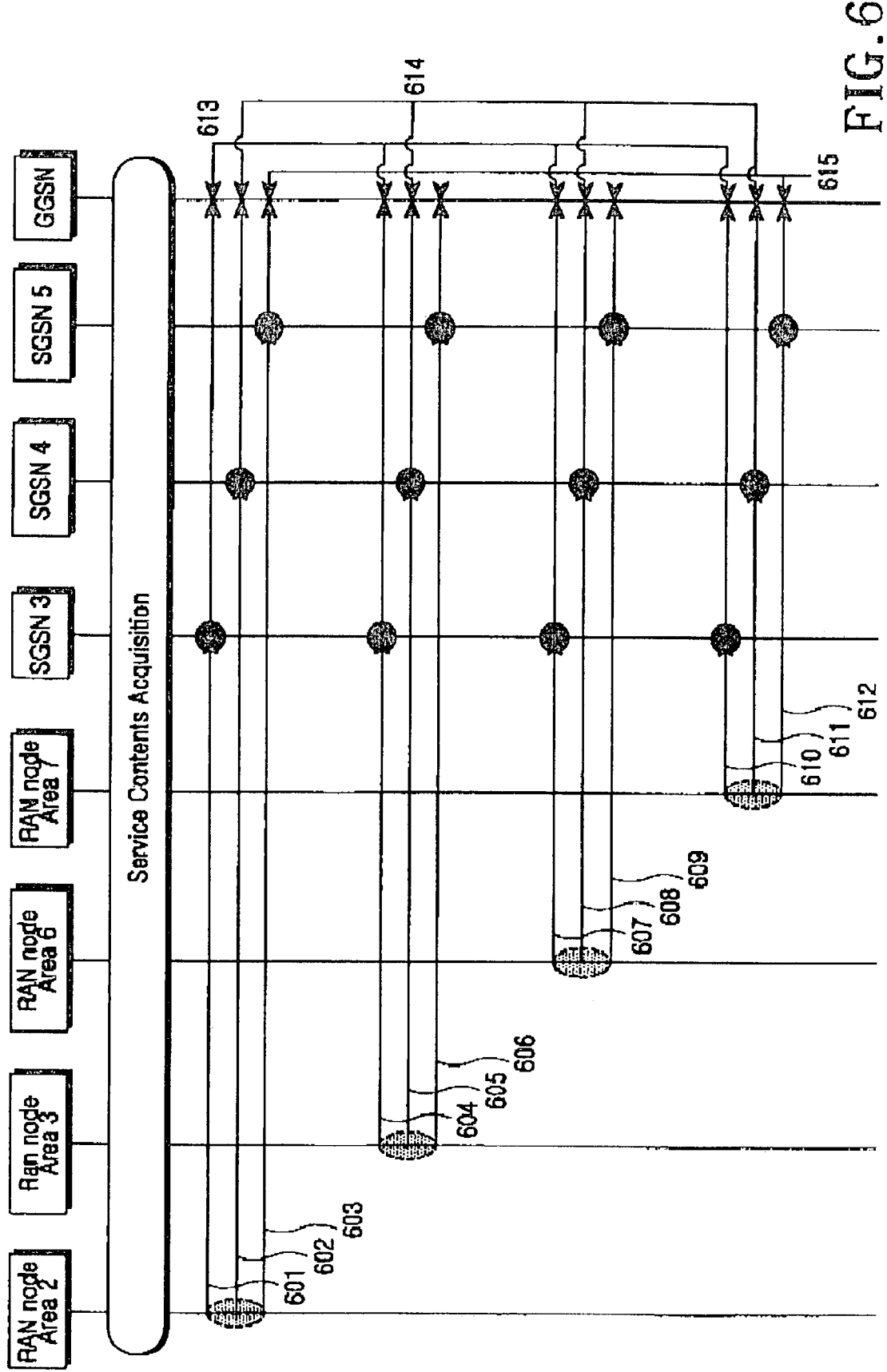
FIG. 6 is a ladder diagram conceptually illustrating an exemplary method of assigning a transmission path, which can be proposed in a mobile communication system with a lu-Flex structure according to an embodiment of the present invention.

When the intact channel setup scenario for MBMS data transmission described in conjunction with FIGS. 3 and 4 is applied in a situation where the concept of Iu-Flex was introduced, a path over which MBMS data is transmitted is repeatedly generated in the same PS pool-area undesirably. That is, in FIG. 5, if particular UEs belonging to PS pool-area #2 select the same MBMS service and then inform a corresponding SGSN of the selection result, there are 12 possible transmission paths according to the RNC to which the UE belongs and the type of the corresponding SGSN, as illustrated in FIG. 6. As illustrated in FIG. 6, each RAN has a plurality of different paths corresponding to the SGSNs. For example, RAN node Area #2 is connected to SGSN #3, SGSN #4, and SGSN #5 by 3 different paths 601, 602, and 603, respectively, and RAN node Area #3 is connected to SGSN #3, SGSN #4, and SGSN #5 by 3 different paths 604, 605, and 606, respectively. Furthermore, RAN node Area #6 is connected to SGSN #3, SGSN #4, and SGSN #5 by 3 different paths 607, 608, and 609, respectively, and RAN node Area #7 is connected to SGSN #3, SGSN #4, and SGSN #5 by 3 different paths 610, 611, and 612, respectively. In addition, GGSN is connected to the SGSN #4, SGSN #5, and SGSN #6 by 3 different paths 613, 614, and 615.

However, considering that the SGSN #3, SGSN #4, and SGSN #5 manage the same PS pool-area (RAN node Area #2, RAN node Area #3, RAN node Area #6, and RAN node Area #7), it is sufficient for the GGSN to make an MBMS data transmission path to only one of the SGSNs and for the SGSN to transmit the MBMS data to corresponding RNCs (or RAN node Areas). In this case, the number of actually required MBMS data paths is 5:4 between RAN node Area and SGSN, and 1 between SGSN and GGSN.

The present invention proposes a method for effectively generating a channel for providing an MBMS service even when the concept 'Iu-Flex' is introduced to the MBMS service.

For this, the following two embodiments are provided.

(1) A method of managing default SGSN information by an RNC (2) A method of managing default SGSN information by an SGSN The default SGSN information (hereinafter, represented by a parameter Def_SGSN_MBMS_sel) has a value corresponding to an identifier of an SGSN designated as a default SGSN.

1. Method of Managing Default SGSN Information by an RNC

First, a description will be made of a method for effectively generating, by an RNC, a transmission path for providing an MBMS service based on default SGSN information.

In order for the RNC to manage default SGSN information related to a corresponding MBMS service, the following rules should be additionally defined as compared with the case where Iu-Flex is not introduced.

(1) An RNC should store and manage default SGSN information according to MBMS identifiers, and provide other SGSNs with related information.

(2) Default SGSN information is set when a UE selects a corresponding MBMS service and then informs an RNC of the selection result, or when other SGSNs provide the RNC with the default SGSN information.

(3) When a default SGSN related to an MBMS service selected by a particular UE is not designated, an RNC manages a value corresponding to an SGSN identifier calculated from P-TMSI of the UE as a default SGSN.

(4) An RNC stores a default SGSN value of an MBMS service received from other SGSNs.

(5) An SGSN designated as a default SGSN for a particular MBMS service, when it does not have information (TMGI, UE information, etc.) related to a corresponding MBMS service, provides an MBMS identifier and its own identifier to all RNCs belonging to the PS pool-area.

(6) When a particular MBMS service is ended, a corresponding default SGSN should announce the end of the corresponding service to all RNCs belonging to the PS pool-area, and the RNCs then delete related information.

A description will now be made of an example of redefining the signaling procedure defined in conjunction with FIGS. 3 and 4, based on the added rules stated above.

For convenience, the description will be separately made with reference to a first process of initially performing registration on a specific MBMS service among UEs belonging to a particular PS pool-area and a second process of selecting the same MBMS service by other UEs belonging to the same PS pool-area after the first process is successfully performed.

1.1 Initial Registration Procedure for Specific MBMS Service

Figure 7:
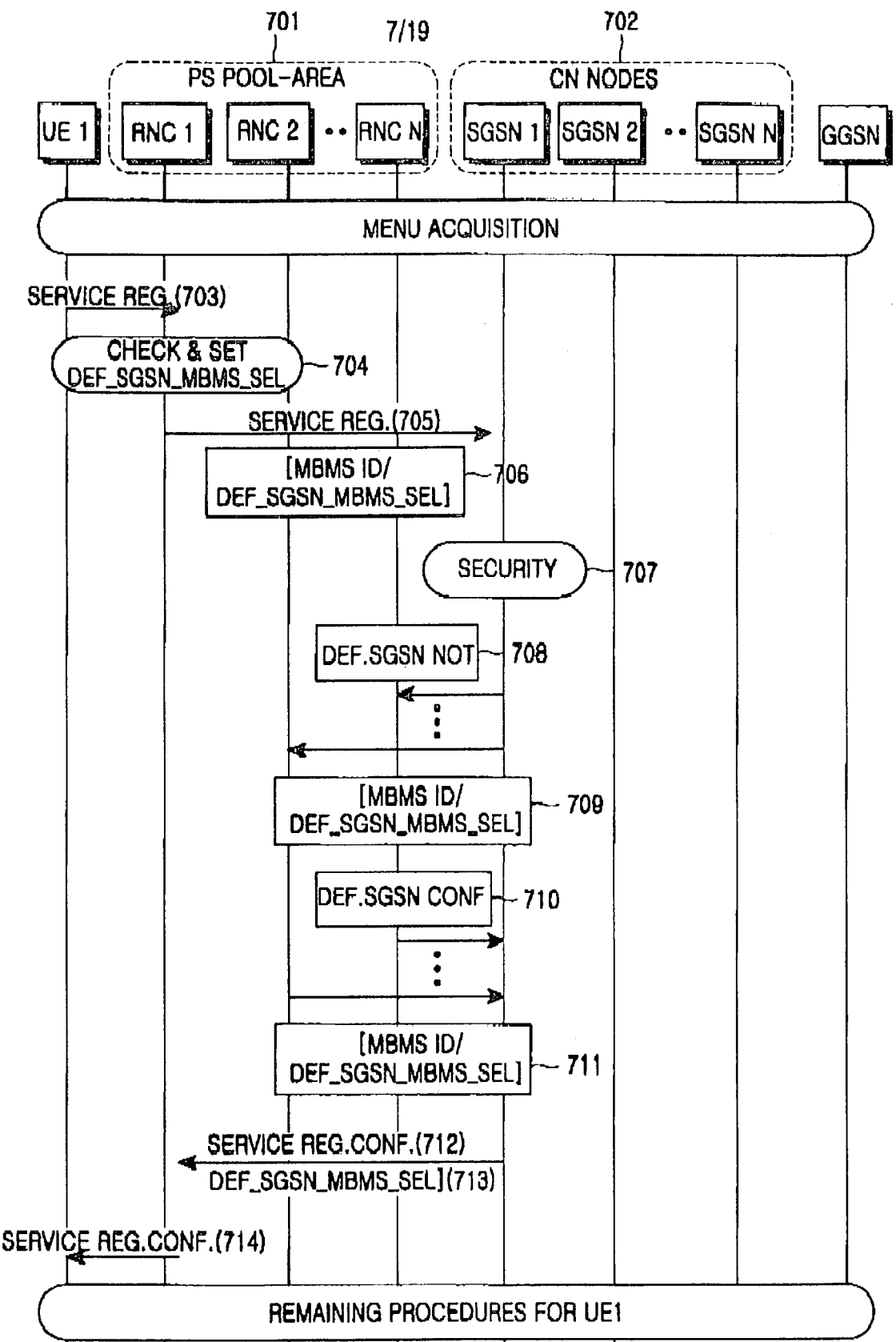
FIG. 7 is a ladder diagram illustrating a signaling procedure for assigning a transmission path in an initial MBMS service in a mobile communication system with a lu-Flex structure according to an embodiment of the present invention.

FIG. 7 illustrates a process of selecting a specific MBMS service by a first UE among UEs belonging to a particular PS pool-area. This procedure corresponds to steps 404 to 406 of FIG. 4. It is assumed in FIG. 7 that a UE #1 is located in an area (RAN node Area #1) managed by an RNC #1, and has P-TMSI assigned by an SGSN #1 through an initial registration process. In addition, it is assumed that RNC #1, RNC #2 and RNC #n belong to the same PS pool-area 701, and the PS pool-area 701 is jointly managed by SGSN #1, SGSN #2, and SGSN #n 702.

Referring to FIG. 7, a UE #1 acquires, through a service acquisition step, information on an available MBMS service from a cell where the UE #1 is currently located, and then selects a particular available MBMS service. If the particular MBMS service is selected, the UE #1 informs an RNC #1 to which the UE #1 belongs that the particular MBMS was selected in step 703. At this moment, the UE #1 transmits to the RNC #1 its own identifier (e.g., P-TMSI) and an identifier of the selected MBMS. This corresponds to the procedure performed between an UE and a UTRAN in step 404 of FIG. 4.

The RNC #1 then checks and changes default SGSN information related to the selected MBMS service based on the information received from the UE #1, in step 704. The signaling procedure illustrated in FIG. 7 is performed with reference to an MBMS service first selected by the UE #1 in a particular PS pool-area. Therefore, it can be understood that a Def_SGSN_MBMS_sel parameter related to the corresponding MBMS service is not generated yet. After perceiving an absence of the parameter related to the MBMS service selected by the UE #1, the RNC #1 designates an identifier of an SGSN (or a default SGSN) corresponding to NRI calculated from P-TMSI, an identifier of the UE #1, as a value of the parameter Def_SGSN_MBMS_sel. That is, as a value of the parameter Def_SGSN_MBMS_sel for identifying a corresponding SGSN, an existing ID_NNS (Intra-Domain NAS Node Selector) value can be designated or another constant can be designated by a particular formula in order to identify a default SGSN. In the embodiment of the present invention, a value of the parameter Def_SGSN_MBMS_sel is set as a value corresponding to an identifier of SGSN #1. If the value of the parameter Def_SGSN_MBMS_sel is successfully set, the RNC #1 can manage information, illustrated in Table 1, on an MBMS service selected by the UE #1.

TABLE 1

| Parameter | Value |
| --- | --- |
| MBMS Service Identifier | Identifier of MBMS service selected by UE #1 |
| Def_SGSN_MBMS_sel | Identifier of SGSN #1 |

The RNC #1 should manage the information of Table 1 according to MBMS services.

If desired information is completely set by the above procedure, the RNC #1 transmits an identifier of an MBMS service selected by the UE #1 and a value 706 of the parameter to the SGSN #1 in step 705. Of course, for authentication, an identifier of the UE #1 should also be transmitted together. This corresponds to the procedure for transmitting a service registration-related signal from a UTRAN to an SGSN in step 404 of FIG. 4.

In step 707, the SGSN #1 performs a process of authenticating the UE #1 based on information managed by an HLR. This is identical to step 405 of FIG. 4. If authentication for the UE #1 is successfully completed by the authentication process, the SGSN #1 perceives that a default SGSN for the MBMS service selected by the UE #1 is the SGSN #1 itself. If the SGSN #1 perceives that the SGSN #1 itself is a default SGSN corresponding to the selected MBMS service, the SGSN #1 determines that it does not have information on the selected MBMS service. Subsequently, the SGSN #1 adds an identifier of the UE #1 to a list of UEs that assigned TMGI related to the selected MBMS service and then requested a corresponding service. In step 708, the SGSN #1 informs all RNCs (RNC #2 to RNC #n) belonging to the same PS pool-area as the RNC #1, that the SGSN #1 was designated as a default SGSN. Information transmitted at this time includes an identifier of the MBMS service selected by the UE #1. The Def_SGSN_MBMS_sel information provided at the SGSN #1 from the RNC #1 may also be transmitted together (See reference numeral 709).

In response, the RNC #2 to the RNC #n set a parameter Def_SGSN_MBMS_sel related to a specific MBMS service in the same operation as performed in step 704 by the RNC #1. Thereafter, in step 710, the RNC #2 to the RNC #n provide the SGSN #1 with the set parameter Def_SGSN_MBMS_sel related to the, specific MBMS service (See reference numeral 711). This represents a process of confirming that the SGSN #1 was successfully registered as a default SGSN. If the steps 708 and 710 are successfully performed, the RNC #2 to the RNC #n can manage the same information as the information of Table 1 managed by the RNC #1.

In step 712, the SGSN #1 transmits the Def_SGSN_MBMS_sel to the RNC #1 (See reference numeral 713), thereby informing the RNC #1 that the MBMS service selected by the UE #1 was successfully registered. In step 714, the RNC #1 informs the UE #1 that the selected MBMS service was successfully registered. This procedure corresponds to step 406 of FIG. 4. At this moment, TMGI can also be transmitted together, as described in conjunction with FIG. 4.

Through the above process, the UE #1 ends a registration process for the selected specific MBMS service through the RNC #1 and the SGSN #1. The other steps, like the step 408 and its succeeding steps of FIG. 4 will be described later. Comparing the signaling procedure illustrated in FIG. 4 with a signaling procedure realized by introducing the Iu-Flex, it can be understood that a parameter managed by the RNC is newly introduced. In addition, it can be noted that a process (step 704) of generating and changing a value of each parameter is added to the RNC. Of course, an additional signaling transmission process (steps 708 and 710) is also introduced, and the same procedure as the procedure of FIG. 4 requires even the information that must be additionally transmitted (See reference numerals 706, 709, and 711).

1.2 Registration Procedure for Initially Registered Specific MBMS Service

Next, a description will be made of a process in which after a UE #1 successfully ends an initial registration procedure for a specific MBMS service, the other UEs belonging to the same PS pool-area as the UE 1 request registration of the same MBMS service. For convenience, the description will be separately made with reference to a first process of registering the same MBMS service through other SGSNs and a second process of registering an MBMS service through SGSN #1 previously designated as a default SGSN.

1.2.1 Registration Through SGSNs Other Than Default SGSN

Figure 8:
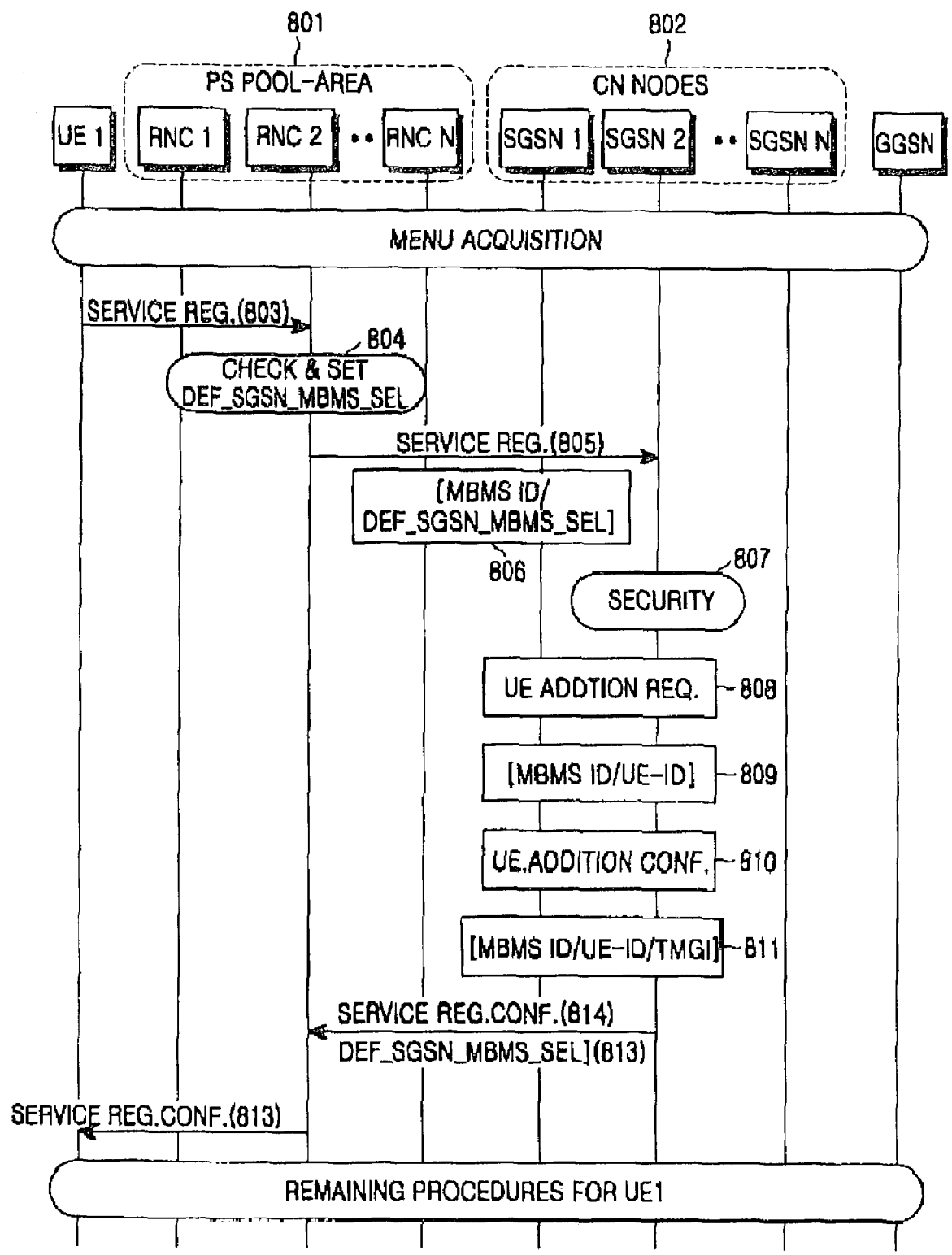
FIG. 8 is a ladder diagram illustrating a signaling procedure for assigning a new transmission path in an MBMS service in a mobile communication system with a lu-Flex structure according to an embodiment of the present invention.

FIG. 8 illustrates an example of a signaling procedure expected when a particular UE (hereinafter referred to as "UE #2") belonging to the same PS pool-area as the UE #1 registers the same MBMS service as an MBMS service provided by the UE #1 through SGSNs other than the SGSN #1 designated as a default SGSN. It is assumed in FIG. 8 that the UE #2 has P-TMSI assigned by SGSN #2.

Referring to FIG. 8, in step 803, the UE #2 selects the same MBMS service as the UE #1 does, and then sends a service request for the selected MBMS service to an RNC #2. At this moment, the UE #2 transmits its own unique identifier and an identifier of the selected MBMS service to the RNC #2. In step 804, the RNC #2 checks that a default SGSN corresponding to the selected MBMS service was designated as an SGSN #1 based on a corresponding parameter Def_SGSN_MBMS_sel managed by an initial registration procedure related to the MBMS service selected by the UE #2. After checking the default SGSN, the RNC #2 determines from P-TMSI of the UE #2 that signaling connection should be established to SGSN #2. Thereafter, in step 805, the RNC #2 transmits an identifier of the selected MBMS service and a value of the parameter Def_SGSN_MBMS_sel to the SGSN #2 (See reference numeral 806). Values of the transmitted parameters are illustrated in Table 1.

In step 807, the SGSN #2 performs an authentication procedure for the UE #2 based on information managed by an HLR. If authentication for the UE #2 is successfully performed by the authentication procedure, the SGSN #2 transmits in step 808 an identifier of the MBMS service selected by the UE #2 and an identifier of the UE #2 (See reference numeral 809), to the SGSN #1, a default SGSN. The SGSN #1, a default SGSN of the selected MBMS service, includes the UE #2 in a list of UEs that desire to receive the corresponding MBMS service. After newly registering the UE #2 in a list of UEs that desire to receive the selected MBMS service, the SGSN #1 informs in step 810 the SGSN #2 that the UE #2 was registered. At this moment, the SGSN #1 transmits an identifier of the selected MBMS service, an identifier of the UE #2, and the TGMI all together (See reference numeral 811). In step 812, the SGSN #2 transmits the Def_SGSN_MBMS_sel to the RNC #2 (See reference numeral 813), thereby informing the RNC #2 that the MBMS service selected by the UE #2 was successfully registered. In step 814, the RNC #2 informs the UE #2 of successful registration of the selected MBMS service.

Comparing the procedure of FIG. 8 with the procedure of FIG. 7, a process (steps 808 and 810) of transmitting UE information to the SGSN #1, a default SGSN, is newly added instead of a process (steps 708 to 711) in which the SGSN #1 selected as a default SGSN transmits information illustrated in Table 1 related to the selected MBMS service to all RNCs belonging to a particular PS pool-area.

1.2.2 Registration Through Default SGSN

Figure 9:
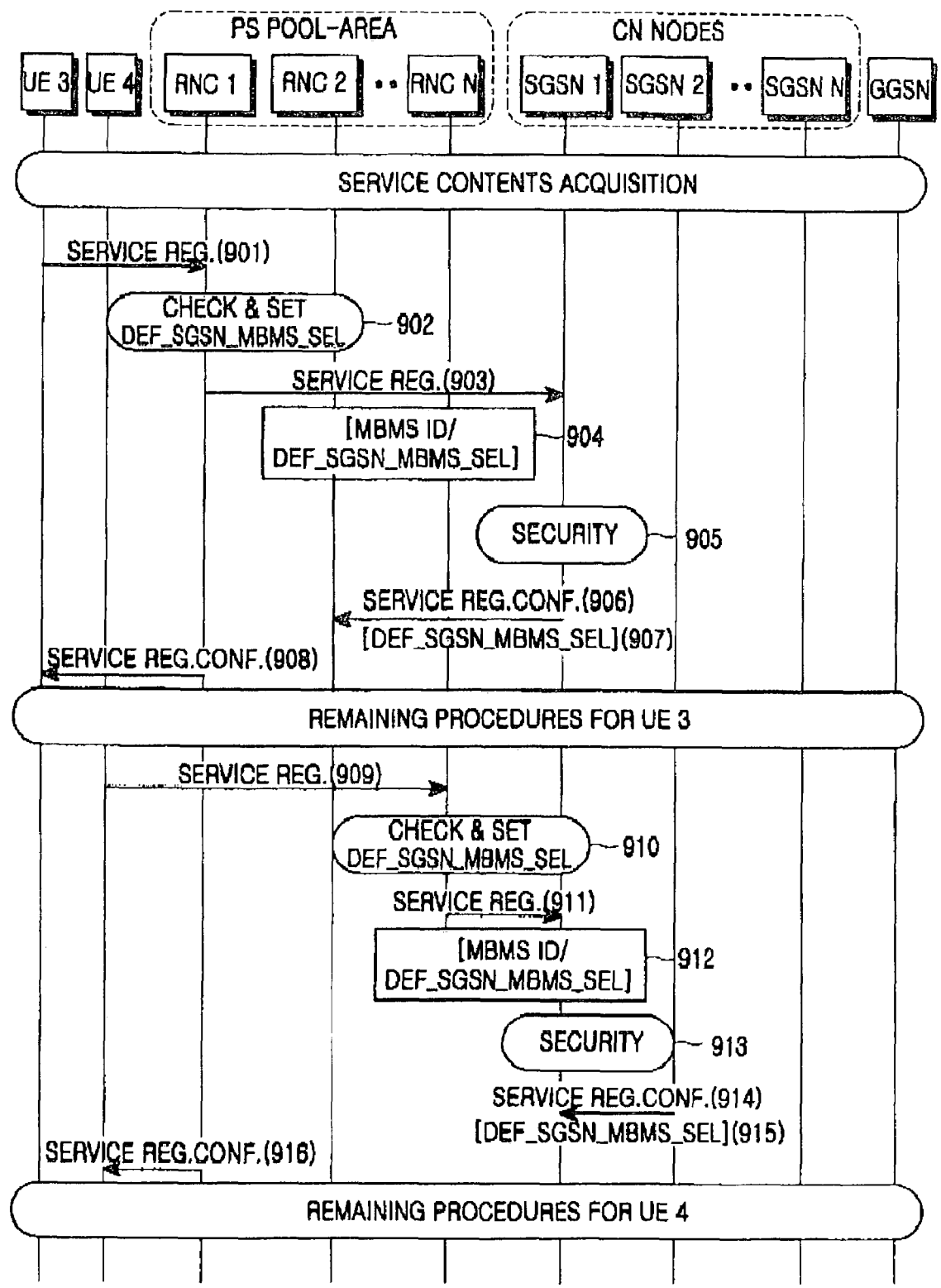
FIG. 9 is a ladder diagram illustrating a signaling procedure for assigning a new transmission path in an MBMS service in a mobile communication system with a lu-Flex structure according to an embodiment of the present invention.

FIG. 9 illustrates an example of a signaling procedure expected when a particular UE belonging to the same PS pool-area as the UE #1 registers the same MBMS service as an MBMS service provided by the UE #1 through an SGSN #1, a default SGSN. The signaling procedure illustrated in FIG. 9 is a part of the signaling procedure described in conjunction with FIG. 7. That is, the signaling procedure illustrated in FIG. 9 corresponds to steps 703, 704, 705, 707, 712, and 714 of FIG. 7. Since steps 708 and 710 represent the process performed in the initial registration procedure by the UE #1, it can be omitted. It is assumed in FIG. 9 that a UE #3 belongs to an RNC #1 and a UE #4 belongs to an RNC #n. The UE #3 and the UE #4 both have P-TMSI assigned by an SGSN #1. When the procedure illustrated in FIG. 9 is successfully performed, the SGSN #1 selected as a default SGSN can obtain information on all UEs that desire to receive a corresponding MBMS service among the UEs belonging to a PS pool-area. Therefore, a transmission path for transmitting specific MBMS data can be set up only between the SGSN #1 selected as a default SGSN and a GGSN.

Referring to FIG. 9, a UE #3 acquires information on an available MBMS service from a cell where it is currently located, through a service acquisition procedure, and then selects a particular available MBMS service. When the particular MBMS service is selected, the UE #3 informs the RNC #1 to which it belongs that the particular MBMS service has been selected in step 901. At this moment, the UE #3 transmits its own unique identifier (e.g., P-TMSI) and an identifier of the selected MBMS service to the RNC #1.

In step 902, the RNC #1 checks and changes default SGSN information related to the selected MBMS service based on the information received from the UE #3. After perceiving that there is a parameter related to the MBMS service selected by the UE #3, the RNC #1 designates NRI calculated from P-TMSI, an identifier of the UE #3, as a value of a parameter Def_SGSN_MBMS_sel. In this example, a value of the Def_SGSN_MBMS_sel is set as a value corresponding to an identifier of an SGSN #1. If the value of the Def_SGSN_MBMS_sel is successfully set, the RNC #1 can add the set parameters to the information illustrated in Table 1 and then manage the information on the MBMS service selected by the UE #3.

If desired information is completely set by the above procedure, the RNC #1 transmits an identifier of an MBMS service selected by the UE #3 and a value 904 of the parameter to the SGSN #1 in step 903. In step 905, the SGSN #1 performs a process of authenticating the UE #3 based on the information managed by an HLR. If authentication for the UE #3 is successfully completed, the SGSN #1 perceives that a default SGSN for the MBMS service selected by the UE #3 is the SGSN #1 itself. The SGSN #1 adds an identifier of the UE #3 to a list of UEs that requested a corresponding service. In step 906, the SGSN #1 transmits the Def_SGSN_MBMS_sel to the RNC #1, thereby to inform the RNC #1 that the MBMS service selected by the UE #3 was successfully registered. In step 908, the RNC #1 informs the UE #3 that the selected MBMS service was successfully registered.

Although steps 909 to 916 of registering an MBMS service selected by the UE #4 have not be described in detail, these steps are performed in the same procedure as the steps 901 to 908, and therefore, will not be described again.

1.3 Service Announcement Procedure for Specific MBMS Service

Figure 10:
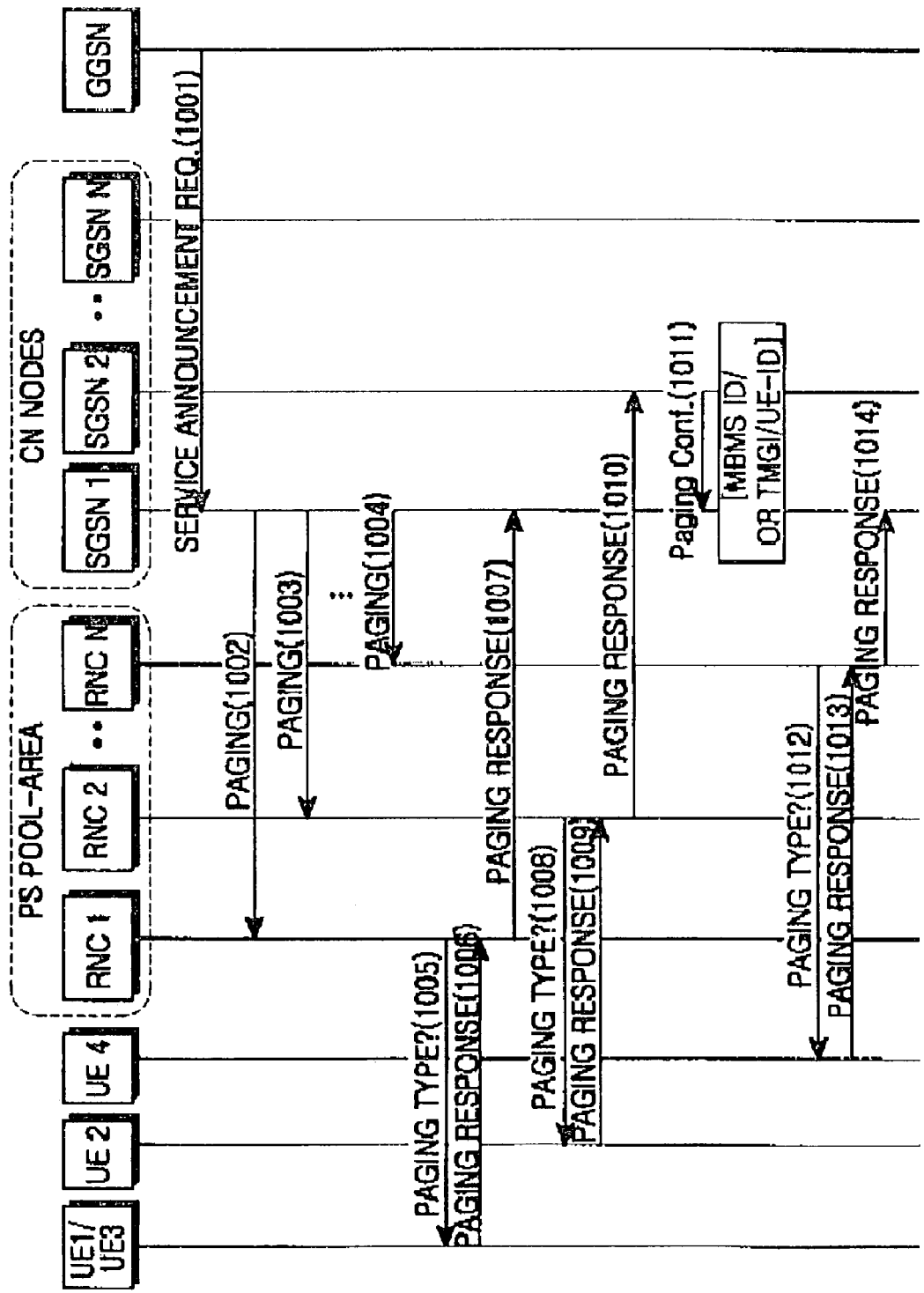
FIG. 10 is a ladder diagram illustrating a signaling procedure for informing target UEs of a start of an MBMS service scheduled to be serviced later in a mobile communication system with a lu-Flex structure according to an embodiment of the present invention.

FIG. 10 illustrates a method for announcing that an MBMS service has been actually provided to UEs for which a specific MBMS service was registered through the procedures presented in FIGS. 7 to 9. This corresponds to the signaling procedure performed in steps 408 and 409 of FIG. 4.

Referring to FIG. 10, in step 1001, a GGSN announces start of a service to an SGSN #1 selected as a default SGSN before an MBMS service selected by UEs in FIGS. 7, 8 and 9 is started.

The SGSN #1, after being announced start of the selected MBMS service by the GGSN, announces start of a corresponding service to RNCs managing UEs that requested reception of the corresponding MBMS service among all RNCs (RNC #1 to RNC #n) belonging to a particular PS pool-area, in steps 1002 to 1004. As a message available at this moment, a paging message, an existing RANAP (Radio Access Network Application Part) message, can be used. The paging message may be transmitted to all RNCs belonging to the PS pool-area, in case a UE that selected the corresponding MBMS service moves to another cell.

Upon receipt of the paging message, the RNCs must announce start of the registered MBMS service to related UEs. This procedure is performed in steps 1005, 1008, and 1012. A message available for these steps includes a paging type #1 and a paging type #2. A message type can be selected depending on an RRC state of the corresponding UE. Upon receiving the paging type #1 or paging type #2, the UEs inform a corresponding RNC that they will actually receive the MBMS service selected by them. This procedure corresponds to steps 1006, 1009, and 1013. In step 1006, the UE #1 and the UE #3 inform the RNC #1 that they will actually receive the selected MBMS service. In step 1009, the UE #2 informs the RNC #2 that it will actually receive the selected MBMS service. In step 1013, the UE #4 informs the RNC #n that it will actually receive the selected MBMS service. A message available at this moment includes a paging response message.

The RNCs inform SGSNs connected to the corresponding MBMS service that corresponding UEs are requesting the MBMS service. That is, the RNC #1 and the RNC #n inform the SGSN #1 selected as a default SGSN that the UE #1, UE #3, and UE #4 desire to receive the MBMS service. This process corresponds to step 1007 and 1014. However, the RNC #2 must inform the SGSN #2 that the UE #2 desires to receive the MBMS service, and the SGSN #2 must announce this again to the SGSN #1. This corresponds to steps 1010 and 1011. In step 1011, an MBMS identifier or TMGI, and a UE identifier must be transmitted.

After all these steps are successfully performed, a transmission path for providing an MBMS service can be set up among the UEs, the RNCs (or UTRANs), and the SGSN #1 selected as a default SGSN through steps 411, 412, 413, and 414 of FIG. 4.

1.4 Registration Procedure for MBMS Service Currently in Service

Figure 11:
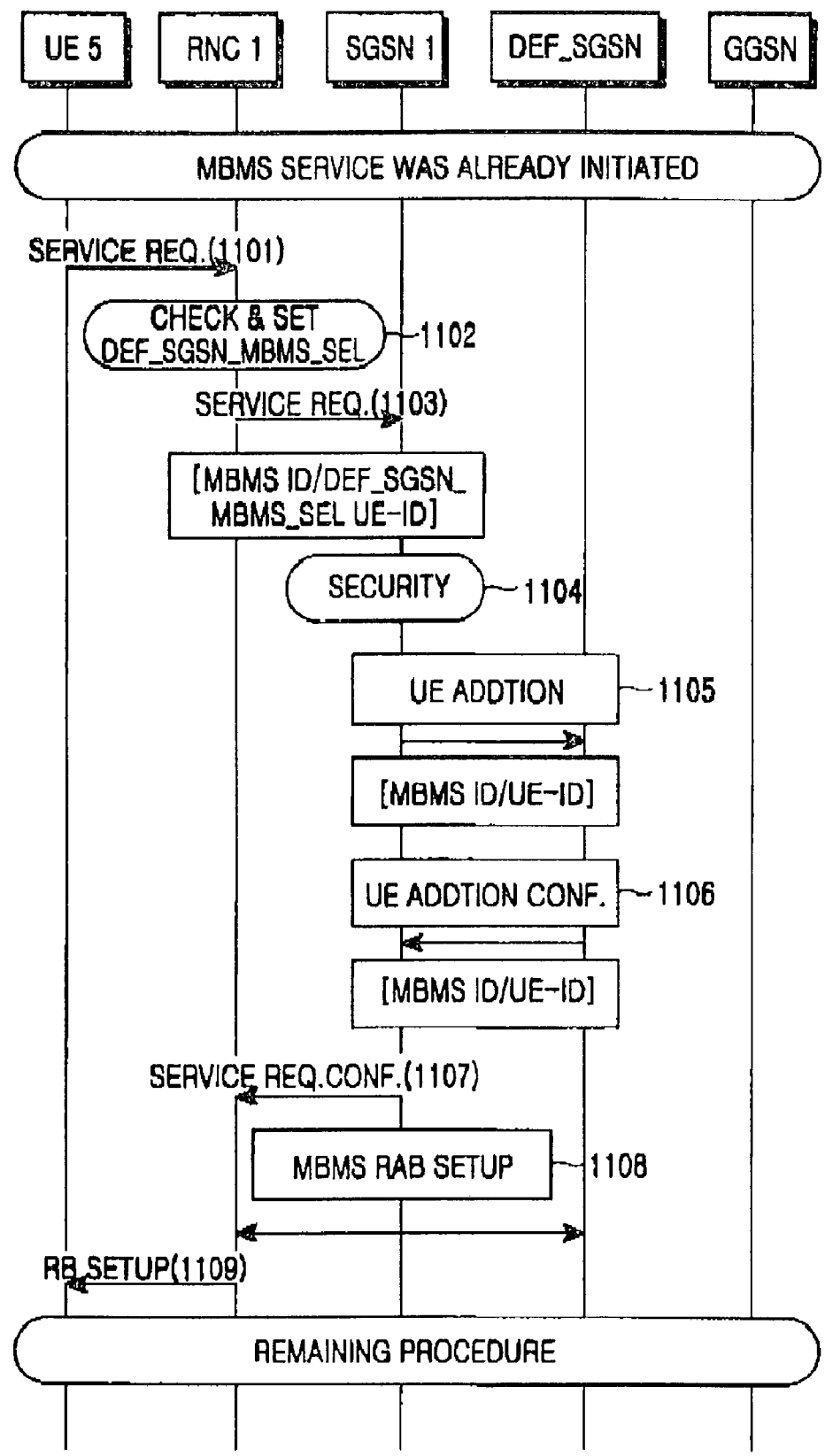
FIG. 11 is a ladder diagram illustrating a signaling procedure performed when a UE selects an MBMS service in a mobile communication system according to an embodiment of the present invention.

FIG. 11 illustrates a procedure expected when a UE selects an MBMS service that was already initiated in a particular PS pool-area. In this case, all RNCs included in the PS pool-area already have information on a default SGSN for a corresponding MBMS service, while all steps illustrated in FIGS. 7 to 10 are performed. It is assumed in FIG. 11 that a UE #5 belongs to an RNC #1 and an SGSN #1 has assigned P-TMSI. In addition, it is assumed that a default SGSN of an MBMS service requested by the UE #5 has been designated by Def_SGSN_MBMS_sel. Furthermore, it is assumed in FIG. 11 that a default SGSN is defined as Def_SGSN.

Referring to FIG. 11, in step, a UE #5 selects a previously initiated MBMS service and informs an RNC #1 of the selection result. In step 1102, the RNC #1 checks a parameter Def_SGSN_MBMS_sel related to the MBMS service selected by the UE #5. In this example, a value of the parameter Def_SGSN_MBMS_sel means Def_SGSN. In step 1103, the RNC #1 determines from P-TMSI of the UE #5 that information related to the MBMS service selected by the UE #5 should be transmitted to the SGSN #1, and then announces this situation to the SGSN #1. Steps 1101, 1102, and 1103 correspond to the step 304 of FIG. 3.

In step 1104, the SGSN #1 performs an authentication procedure for authenticating the UE #5 based on information managed by an HLR. The authentication procedure corresponds to the step 305 of FIG. 3. In step 1105, the SGSN #1 provides an identifier of the MBMS service selected by the UE #5 and an identifier of the UE #5 to Def_SGSN designating a default SGSN. The Def_SGSN adds the UE #5 to a list (or multicast group) of UEs receiving the corresponding MBMS data, and then informs in step 1106 the SGSN #1 of the addition of the UE #5. In step 1107, the SGSN #1 informs the RNC #1 that registration of the UE #5 was successfully completed. This procedure corresponds to step 306 of FIG. 3.

If the MBMS service previously selected by the UE #5 is being provided even in the RNC #1, i.e., if other UEs belonging to the RNC #1 are already receiving the corresponding MBMS service, the RNC #1 can transmit a parameter needed by the UE #5 in receiving MBMS data in step 1109. However, when other RNCs belonging to the same PS pool-area as the RNC #1 are providing corresponding MBMS data and there is no UE receiving the corresponding MBMS data among the UEs belonging to the RNC #1, a procedure of step 1108 for setting up a path for MBMS data transmission between the Def_SGSN and the RNC #1 is required.

Compared with the procedure of FIG. 3, the procedure of FIG. 11 further includes the steps 1102, 1104, 1105, 1106, and 1108. Even in step 1103 that was already defined in FIG. 3, a value of a transmission parameter is different.

1.5 Ending Procedure of Specific MBMS Service

Figure 12:
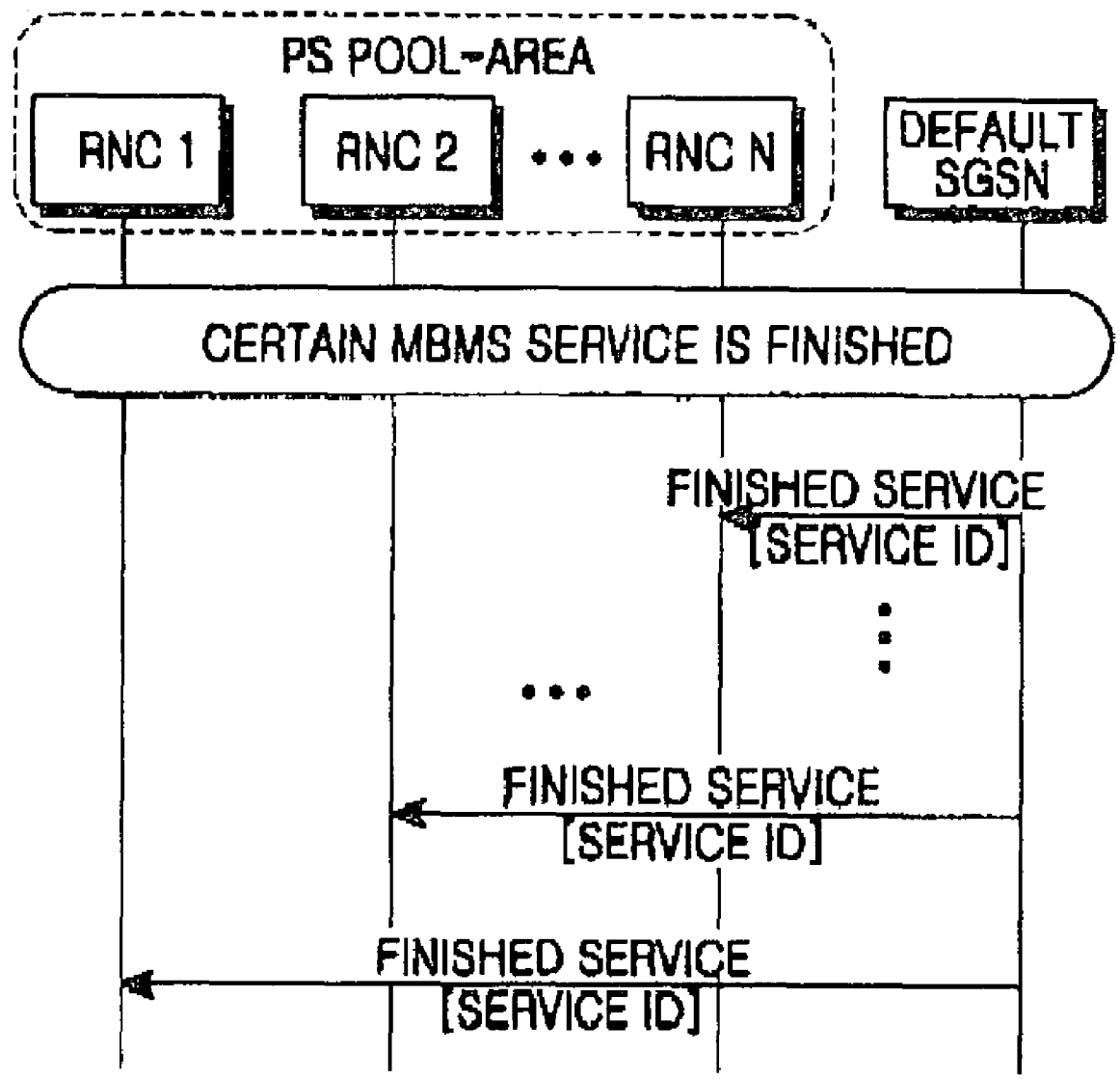
FIG. 12 is a ladder diagram illustrating a signaling procedure for ending an MBMS service currently in service in a mobile communication system with a lu-Flex structure according to an embodiment of the present invention.

FIG. 12 shows that if a specific MBMS service is ended, corresponding default SGSN-related information managed by each RNC must be deleted. For this, a default SGSN transmits an identifier of the corresponding MBMS service to all RNCs belonging to the PS pool-area. Upon receiving the MBMS identifier, the RNCs delete information, illustrated in Table 1, on the corresponding MBMS service, managed by them.

1.6 Another Example of Initial Registration Procedure for Specific MBMS Service

In the initial registration procedure described with reference to FIG. 7, it is assumed that a UE requests an RNC to provide a specific MBMS service. However, in another example of the initial registration procedure, which will be described below, it is assumed that the UE requests an SGSN to provide a specific MBMS service and the SGSN then informs an RNC wirelessly connectable to the UE that a specific MBMS service was requested by the UE.

Figure 18:
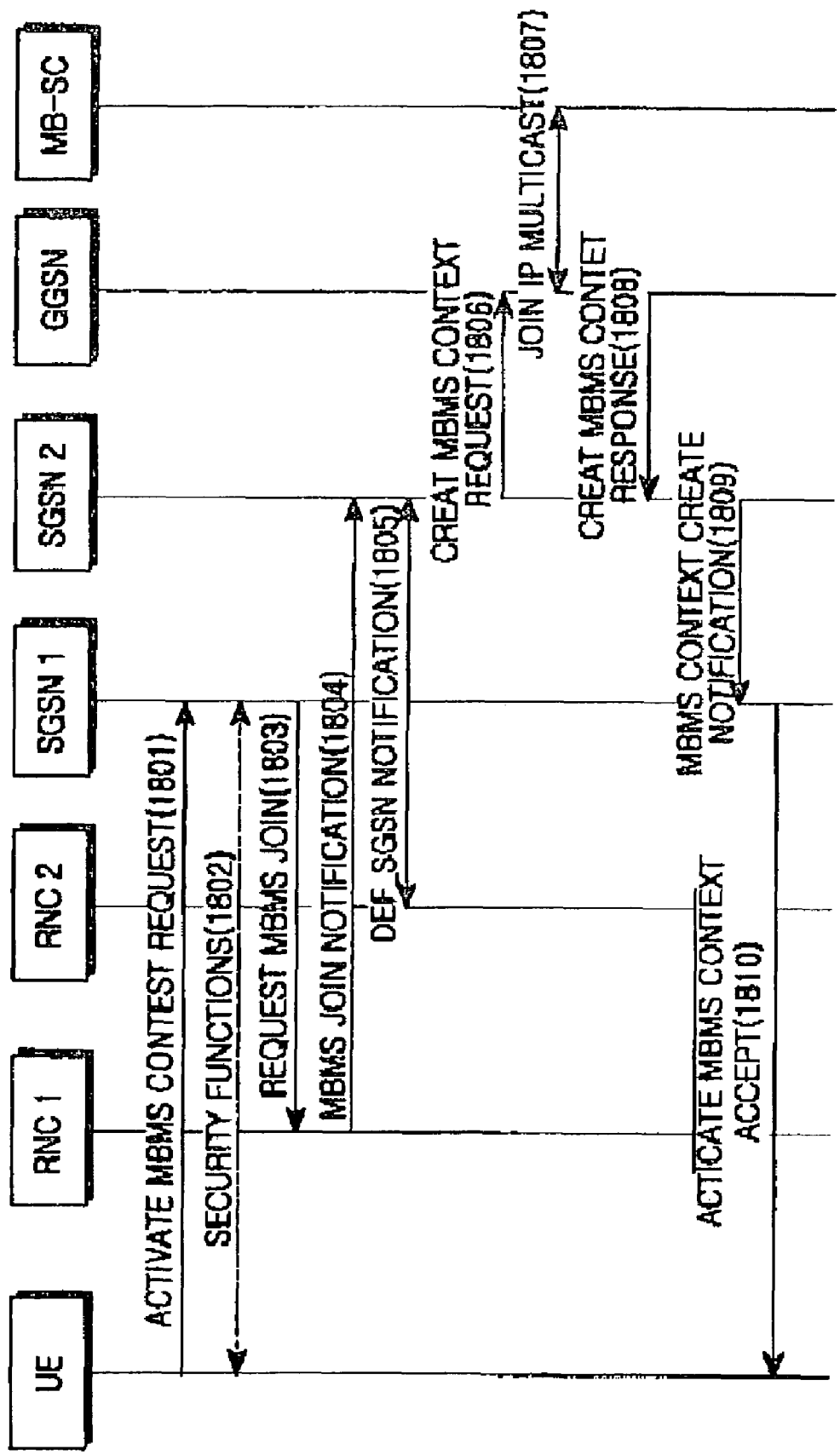
FIG. 18 is a ladder diagram illustrating a signaling procedure where a NAS (Non-Access Stratum) message is used to assign a transmission path in an MBMS service in a mobile communication system with a lu-Flex structure according to an embodiment of the present invention.

FIG. 18 has the same assumption as FIG. 7. That is, FIG. 18 illustrates a process of initially selecting a specific MBMS service by a particular UE among UEs belonging to a particular PS pool-area. In this example, however, information on an MBMS service selected by the UE is included in a NAS message. The "NAS message" is a message including contents that an RNC cannot know. For convenience, it will be assumed that an RNC #1 and an RNC #2 belong to the same PS pool-area, and an SGSN #1 and an SGSN #2 jointly manage RNCs belonging to the PS pool-area.

Referring to FIG. 18, in step 1801, a UE belonging to an RNC #1 selects a specific MBMS service and then informs an SGSN #1 of the selection result along with its own unique identifier. Herein, it is assumed that the UE has P-TMSI assigned by the SGSN #1. An MBMS-related identifier for identifying the specific MBMS service selected by the UE and the identifier of the UE can be transmitted to the SGSN #1 through an Activate MBMS Context Request message.

Upon receiving the Activate MBMS Context Request message, the SGSN #1 verifies whether the UE can receive corresponding MBMS data in step 1802. If the verification procedure is successfully performed, the SGSN #1 transmits information on an identifier related to the MBMS service selected by the UE, to the RNC #1 in step 1803. The information on the identifier related to the selected MBMS service can be transmitted through a Request MBMS Join message. The RNC #1 then determines whether a default SGSN for an MBMS service corresponding to the MBMS-related identifier is designated, based on the received information on the MBMS-related identifier. If a default SGSN is not designated, the RNC #1 designates a particular SGSN as a default SGSN. In step 1804, the RNC #1 transmits an identifier of the UE and an identifier of the selected MBMS service to the designated default SGSN through an MBMS Join Notification message. However, if a default SGSN related to the selected MBMS service is already designated, the RNC #1 transmits the identifier of the UE and the identifier of the selected MBMS service to the corresponding default SGSN. It is assumed in FIG. 18 that the default SGSN is designated as an SGSN #2. In this example, the invention provides a method for designating a default SGSN for a specific MBMS service by an RNC. As the simplest method, the RNC can designate a default SGSN considering a load of the SGSN, like in the existing lu-Flex.

The default SGSN sets information on the selected MBMS service, and then provides all RNCs belonging to the same PS pool-area as the RNC #1, with an identifier of the selected MBMS service and information indicating that it is designated as a default SGSN of the corresponding MBMS service in step 1805. However, if the SGSN #2 has already stored information on the corresponding MBMS service, it adds the UE identifier received in step 1804 to corresponding MBMS service-related information, and then proceeds to step 1809.

Steps 1806 and 1808 represent a process of setting up a channel for transmitting corresponding MBMS data between the SGSN #2 designated as default SGSN and a GGSN. This process is performed when the UE first selects in step 1801 a corresponding MBMS service in the PS pool-area managed by the SGSN #2. Upon receiving a channel setup request for transmission of corresponding MBMS data from the SGSN #2, the GGSN transmits a Join IP Multicast message to an MB-SC in step 1807, to announce that it also has received the MBMS data.

In step 1809, the SGSN #2 assigns TMGI related to the selected MBMS service, and then transmits the assigned TMGI to the SGSN #1 through an MBMS Context Create Notification message. In step 1810, the SGSN #1 transmits the TMGI provided from the SGSN #2 to the UE.

As described above, when another UE belonging to the same PS pool-area as the UE selects the same MBMS service, the steps 1806, 1807, and 1808 can be omitted. Meanwhile, in step 1804, the RNC (RNC #1 or RNC #2 in this example) transmits an identifier of the corresponding UE and an identifier of the MBMS service to the SGSN #2 previously designated as a default SGSN.

2. Method of Managing Default SGSN Information by SGSN

Next, a description will be made of a method for managing by an SGSN the information illustrated in FIG. 1. In order for the SGSN to manage information related to a corresponding MBMS service, the following rules should be additionally defined as compared with the case where Iu-Flex is not introduced.

(1) An SGSN should store and manage default SGSN information according to MBMS identifiers. For reference, even when the Iu-Flex is not introduced, the SGSN should manage TMGI and a list of UEs that desire to receive corresponding service data, according to MGMS services.

(2) Default SGSN information is set when a UE receives an identifier of an MBMS service selected by a UE, or when information on a default SGSN is received from other SGSNs.

(3) When a default SGSN related to an MBMS service selected by a particular UE is not designated, an SGSN designates its own identifier as a value of a default SGSN. In addition, the SGSN provides other SGSNs with its own identifier and a corresponding MBMS identifier.

(4) An SGSN stores the information illustrated in Table 1, using a default SGSN value of MBMS data received from other SGSNs.

(5) When a particular MBMS service is ended, a corresponding default SGSN transmits an identifier of a corresponding MBMS service to other SGSNs that jointly manage the PS pool-area, and all the SGSNs receiving the MBMS identifier delete information of Table 1 managed by them.

A description will now be made of an example of redefining the signaling procedure defined in conjunction with FIGS. 3 and 4, based on the added rules stated above. For convenience, the description will be separately made with reference to a first process of initially performing registration on a specific MBMS service among UEs belonging to a particular PS pool-area and a second process of selecting the same MBMS service by other UEs belonging to the same PS pool-area after the first process is successfully performed.

2.1 Initial Registration Procedure for Specific MBMS Service

Figure 13:
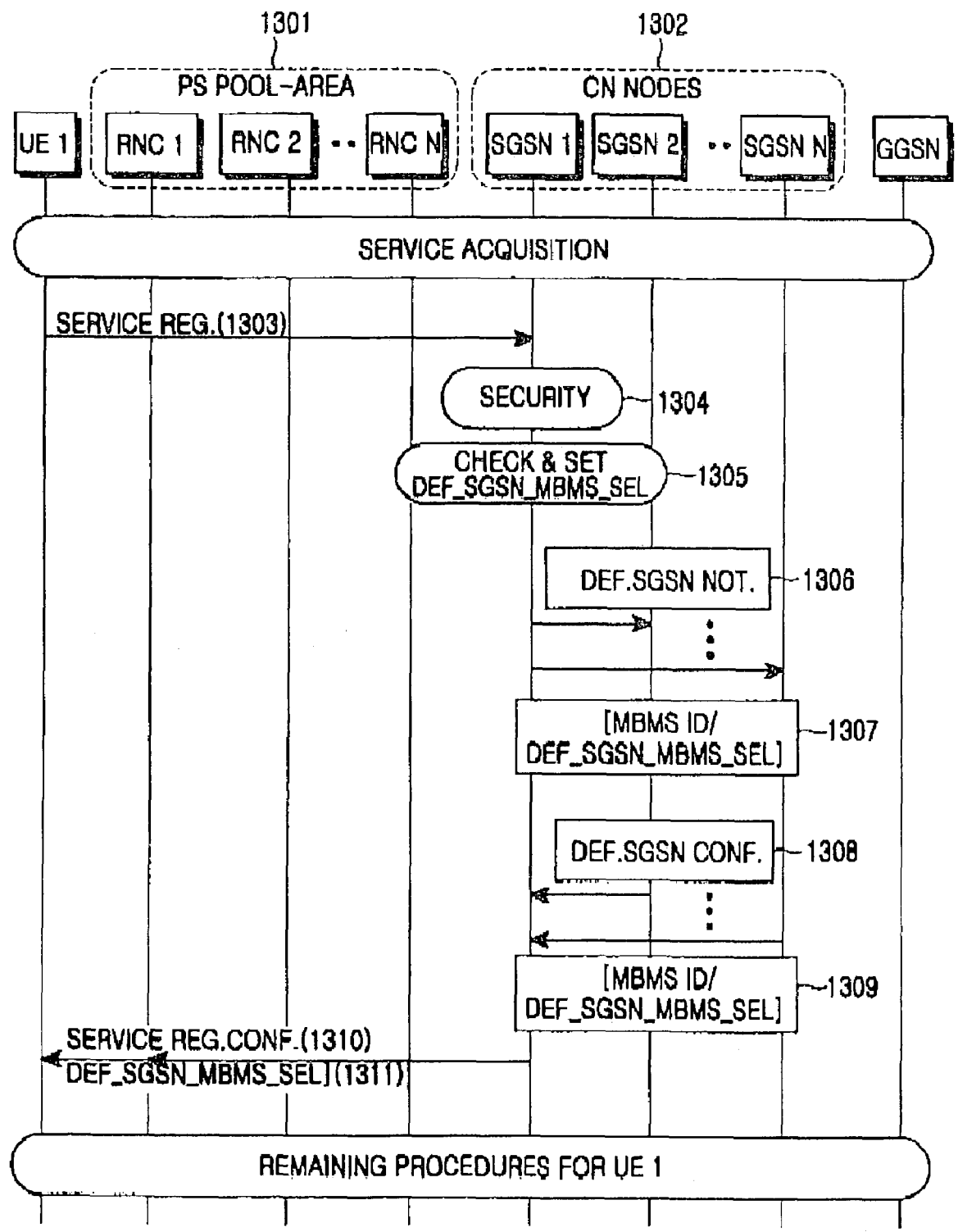
FIG. 13 is a ladder diagram illustrating a signaling procedure for assigning a transmission path in an initial MBMS service in a mobile communication system with a lu-Flex structure according to another embodiment of the present invention.

FIG. 13 illustrates a process of selecting a specific MBMS service by a first UE among UEs belonging to a particular PS pool-area. This procedure corresponds to steps 404 to 406 of FIG. 4, and is another example in the same situation as described in conjunction with FIG. 7. It is assumed in FIG. 13 that a UE #1 is located in an area (RAN node Area #1) managed by an RNC #1, and has P-TMSI assigned by an SGSN #1 through an initial registration process. In addition, it is assumed that RNC #1, RNC #2, and RNC #n belong to the same PS pool-area 1301, and the PS pool-area 1301 is jointly managed by SGSN #1, SGSN #2, and SGSN #n 1302.

Referring to FIG. 13, a UE #1 acquires, through a service acquisition step, information on an available MBMS service from a cell where the UE #1 is currently located, and then selects a particular available MBMS service. If the particular MBMS service is selected, the UE #1 informs an RNC #1 to which the UE #1 belongs that the particular MBMS was selected in step 1303. The RNC #1 determines from an identifier of the UE #1 that a corresponding message must be transmitted to an SGSN #1. As a result of the determination, the RNC #1 transmits the message to the SGSN #1. At this moment, the UE #1 transmits to the SGSN #1 its own identifier (e.g., P-TMSI) and an identifier of the selected MBMS. This corresponds to step 404 of FIG. 4.

The SGSN #1 then performs in step 1304 a process of authenticating the UE #1 based on information managed by an HLR. This is identical to step 405 of FIG. 4. If authentication for the UE #1 is successfully completed by the authentication process, the SGSN #1 perceives that a default SGSN for an MBMS service selected by the UE #1 is the SGSN #1 itself. If the SGSN #1 perceives that it is a default SGSN for the selected MBMS service, the SGSN #1 determines that it does not have information on the selected MBMS service. Further, the SGSN #1 assigns TMGI related to the selected MBMS service, and then adds an identifier of the UE #1 to a list of UEs that requested the corresponding MBMS service. If authentication is successfully completed by the authentication procedure, the SGSN #1 checks and changes default SGSN information related to the selected MBMS service based on the information received from the UE #1, in step 1305. The signaling procedure illustrated in FIG. 13 is performed with reference to an MBMS service first selected by the UE #1 in a particular PS pool-area. Therefore, it can be understood that a Def_SGSN_MBMS_sel parameter related to the corresponding MBMS service is not generated yet. The parameter Def_SGSN_MBMS_sel can be generated in the way described in the first embodiment. That is, as an identifier for identifying a default SGSN, a unique identifier for identification of an SGSN can be designated using existing information or a particular formula. Therefore, as for the parameter Def_SGSN_MBMS_sel of the MBMS service selected by the UE #1, the RNC #1, after perceiving absence of a generation-related parameter, sets an identifier of an SGSN corresponding to NRI calculated from P-TMSI, an identifier of the UE #1, as a value of the parameter Def_SGSN_MBMS_sel. In the embodiment of the present invention, a value of the parameter Def_SGSN_MBMS_sel is set as a value corresponding to an identifier of SGSN #1. If the value of the parameter Def_SGSN_MBMS_sel is successfully set, the SGSN #1 can manage information, illustrated in Table 2, on an MBMS service selected by the UE #1.

TABLE 2

| Parameter | Value |
|---|---|
| MBMS Service Identifier | Identifier of MBMS service selected by UE #1 |
| Def_SGSN_MBMS_sel | Identifier of SGSN #1 |
| TMGI | Assigned TMGI |
| UE list | Identifier of UE requesting the MBMS service |

Default SGSNs selected for specific MBMS services should manage the information of Table 2 according to MBMS services.

If desired information is completely set by the above procedure, the SGSN #1 transmits, in step 1306, an identifier of an MBMS service selected by the UE #1 and a value 1307 of the parameter to all SGSNs belonging to the same PS pool-area as the SGSN #1. That is, the SGSN #1 informs the remaining SGSNs (SGSN #2 to SGSN #n) that it is designated as a default SGSN for the corresponding MBMS service. Information transmitted at this moment can become not only the MBMS identifier but also a default SGSN service identifier Def_SGSN_MBMS_sel (See reference numeral 1307).

In response, the SGSN #2 to the SGSN #n set a parameter Def_SGSN_MBMS_sel related to a specific MBMS service in the same way as the operation performed in step 1305. In step 1308, the SGSN #2 to the SGSN #n transmit the set parameter Def_SGSN_MBMS_sel related to a specific MBMS service to the SGSN #1 (See reference numeral 1309). This represents a process of confirming that the SGSN #1 was successfully registered as a default SGSN. If the steps 1306 and 1308 are successfully performed, the SGSN #2 to the SGSN #n can manage the same information as the information of Table 2 managed by the SGSN #1.

In step 1310, the SGSN #1 transmits the Def_SGSN_MBMS_sel to the RNC #1, thereby to inform the RNC #1 that the MBMS service selected by the UE #1 was successfully registered. The RNC #1 then informs the UE #1 that the selected MBMS service was successfully registered. This procedure corresponds to step 406 of FIG. 4. At this moment, TMGI can also be transmitted together, as described in conjunction with FIG. 4.

Through the above process, the UE #1 ends a registration process for the selected specific MBMS service through the RNC #1 and the SGSN #1. Comparing the signaling procedure illustrated in FIG. 4 with a signaling procedure realized by introducing the Iu-Flex, it can be understood that a parameter managed by the SGSN was newly introduced. In addition, it can be noted that a process (step 1305) of generating and changing a value of each parameter is added to the RNC. Of course, an additional signaling transmission process (steps 1306 and 1308) is also introduced.

2.2 Registration Procedure for Initially Registered Specific MBMS Service

Next, a description will be made of a process in which after a UE #1 successfully ends an initial registration procedure for a specific MBMS service, the other UEs belonging to the same PS pool-area as the UE 1 request registration of the same MBMS service. For convenience, the description will be separately made with reference to a first process of registering an MBMS service through SGSN #1 previously designated as a default SGSN and a second process of registering the same MBMS service through other SGSNs.

2.2.1 Registration Through SGSNs Other Than Default SGSN

Figure 14:
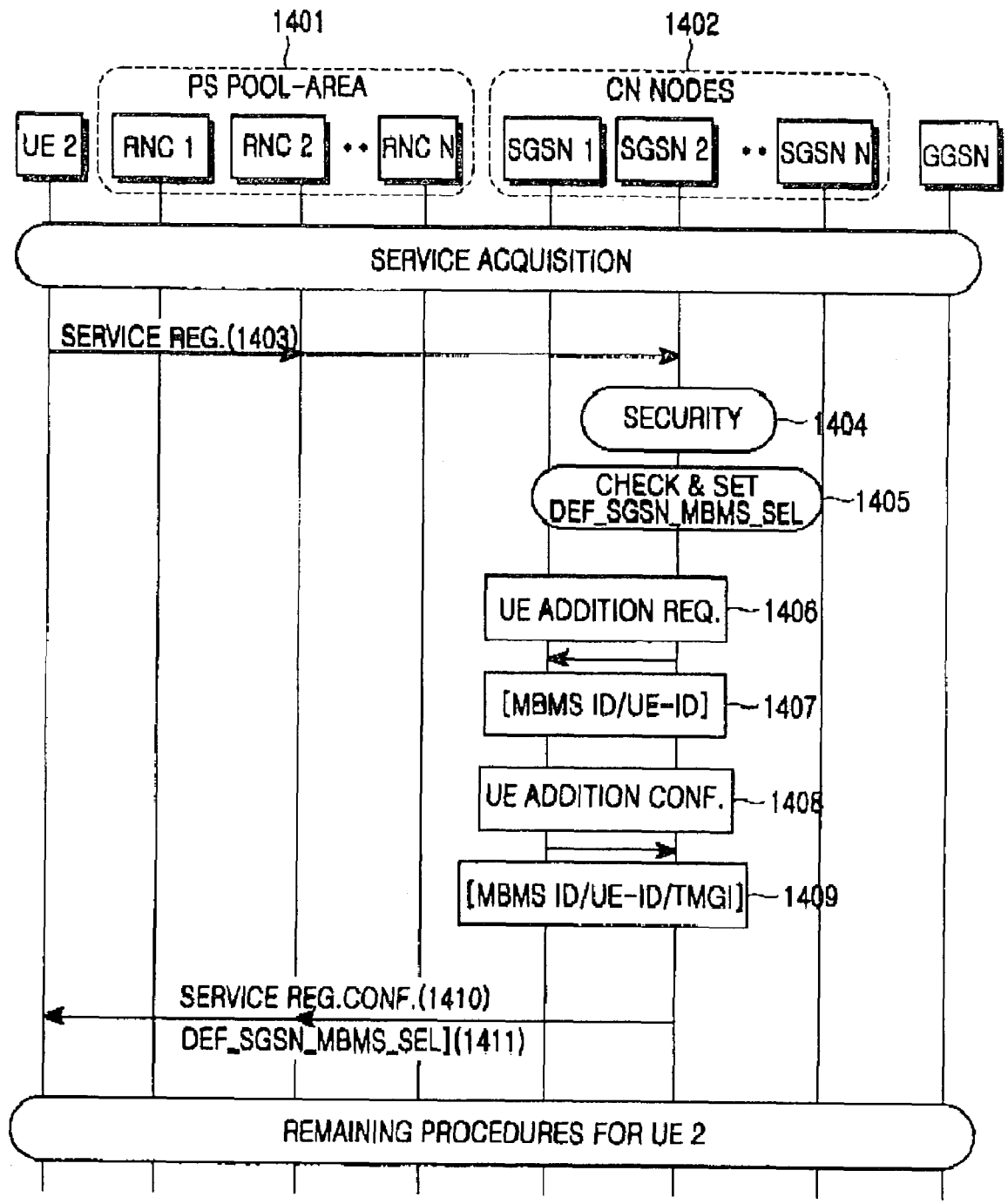
FIG. 14 is a ladder diagram illustrating a signaling procedure for assigning a new transmission path in an MBMS service in a mobile communication system with a lu-Flex structure according to another embodiment of the present invention.

FIG. 14 illustrates an example of a signaling procedure expected when a particular UE (hereinafter referred to as "UE #2") belonging to the same PS pool-area as the UE #1 registers the same MBMS service as an MBMS service provided by the UE #1 through SGSNs other than the SGSN #1 designated as a default SGSN. It is assumed in FIG. 14 that the UE #2 has P-TMSI assigned by SGSN #2.

Referring to FIG. 14, in step 1403, the UE #2 selects the same MBMS service as the UE #1 does, and then sends a service request for the selected MBMS service to an RNC #2. At this moment, the UE #2 transmits its own unique identifier and an identifier of the selected MBMS service to the SGSN #2. In step 1404, the SGSN #2 performs an authentication procedure of the UE #2 based on information managed by an HLR. If authentication for the UE #2 is successfully performed by the authentication procedure, the SGSN #2 can determine in step 1405 that a value of the parameter Def_SGSN_MBMS_sel related to the MBMS service selected by the UE #2 is set for the SGSN #1. In step 1406, the SGSN #2 transmits an identifier of the MBMS service selected by the UE #2 and an identifier of the UE #2 (See reference numeral 1407), to the SGSN #1, a default SGSN. The SGSN #1 adds the UE #2 to a list of UEs that desire to receive the corresponding MBMS service, and then informs the SGSN #2 of the corresponding TMGI (See reference numeral 1419). In step 1410, the SGSN #2 informs the UE #2 that registration on the selected MBMS service was successfully completed.

2.2.2 Registration Through Default SGSN

Figure 15:
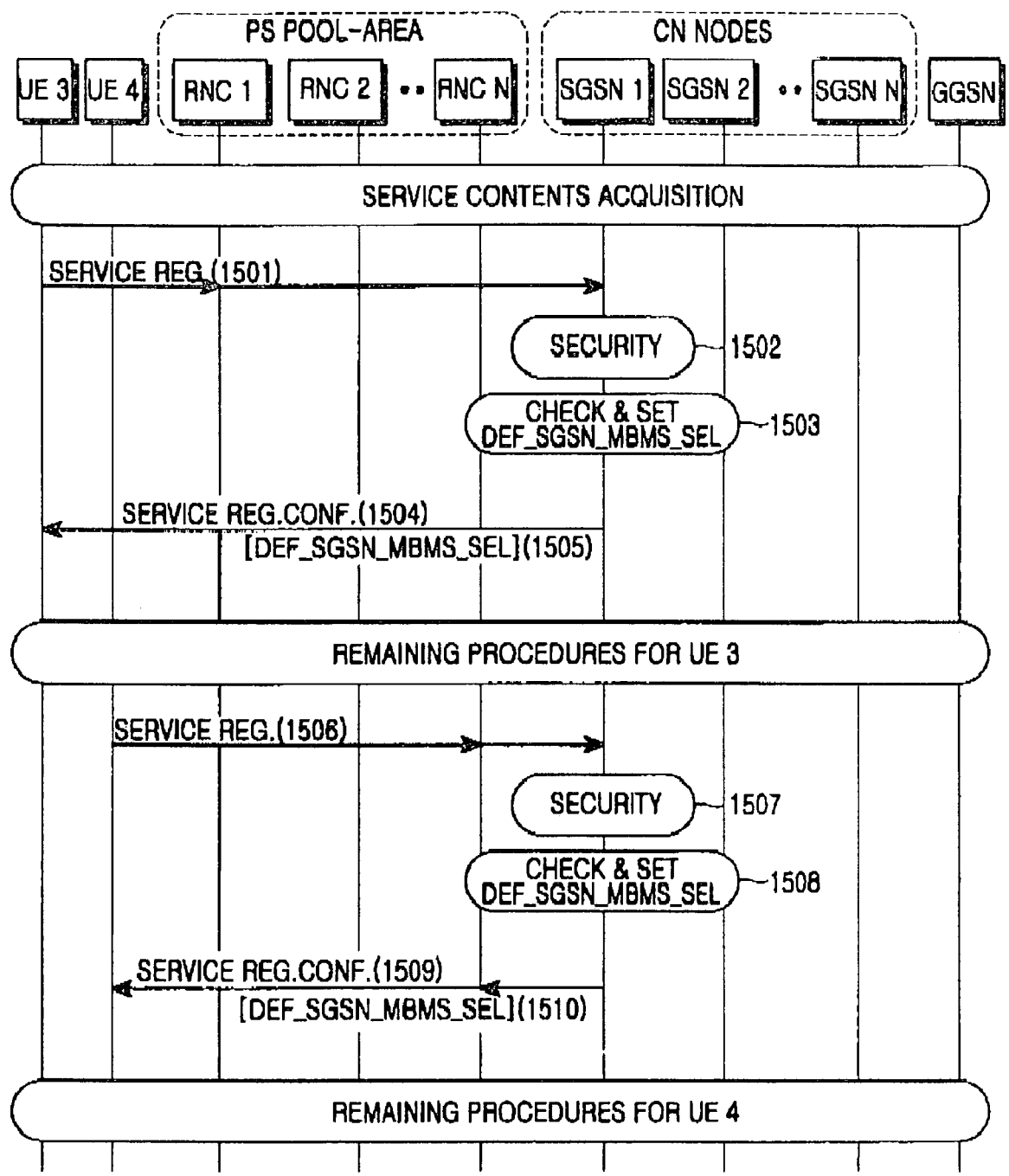
FIG. 15 is a ladder diagram illustrating a signaling procedure for assigning a new transmission path in an MBMS service in a mobile communication system with a pool structure according to another embodiment of the present invention.

FIG. 15 illustrates an example of a signaling procedure expected when the other UEs belonging to the same PS pool-area as the UE #1 continue to request registration of the same MBMS service through an SGSN #1, a default SGSN. It is assumed in FIG. 15 that a UE #3 belongs to an RNC #1 and a UE #4 belongs to an RNC #n. Also, it is assumed that the UE #3 and the UE #4 both have P-TMSI assigned by an SGSN #1.

Referring to FIG. 15, in step 1501, the UE #3 selects the same MBMS service as the UE #1 does, and then sends a service request for the selected MBMS service to an RNC #1. The RNC #1 transmits again the service request to the SGSN #1, a default SGSN. At this moment, the UE #2 transmits its own unique identifier and an identifier of the selected MBMS service to the RNC #2. In step 1502, the SGSN #1 performs an authentication procedure for authenticating the UE #3 based on the information managed by an HLR. If authentication for the UE #3 is successfully performed by the authentication procedure, the SGSN #1 determines in step 1503 that it was already designated as a default SGSN for the MBMS service selected by the UE #3. Further, the SGSN #1 adds the UE #3 to a list of UEs that desires to receive the corresponding MBMS service. In step 1504, the SGSN #1 transmits the Def_SGSN_MBMS_sel to the RNC #1 (See reference numeral 1510). The RNC #1 transmits the Def_SGSN_MBMS_sel provided from the SGSN #1 to the UE #3, thereby to inform the UE #3 that the selected MBMS service was successfully registered. The step 1504, however, can be omitted.

A procedure for registering a UE #4 that selected the same MBMS service as the UE #1 did, in a default SGSN is performed in steps 1506 to 1509. This procedure is performed the same as the procedure performed on the UE #3.

If the procedure presented in FIGS. 13, 14, and 15 is successfully performed, the SGSN #1 selected as a default SGSN can acquire information on all UEs that require to receive the corresponding MBMS service among the UEs belonging to a PS pool-area. Therefore, a transmission path for transmitting specific MBMS data can be set up only between the SGSN #1 and a GGSN.

When an MBMS service is actually provided to UEs that have completed-registration on a specific MBMS service through the procedure presented in FIGS. 13, 14, and 15, a method for reporting this situation follows the signaling procedure illustrated in FIG. 10 in the first embodiment.

2.2.3 Registration of Initiated MBMS Service

Figure 16:
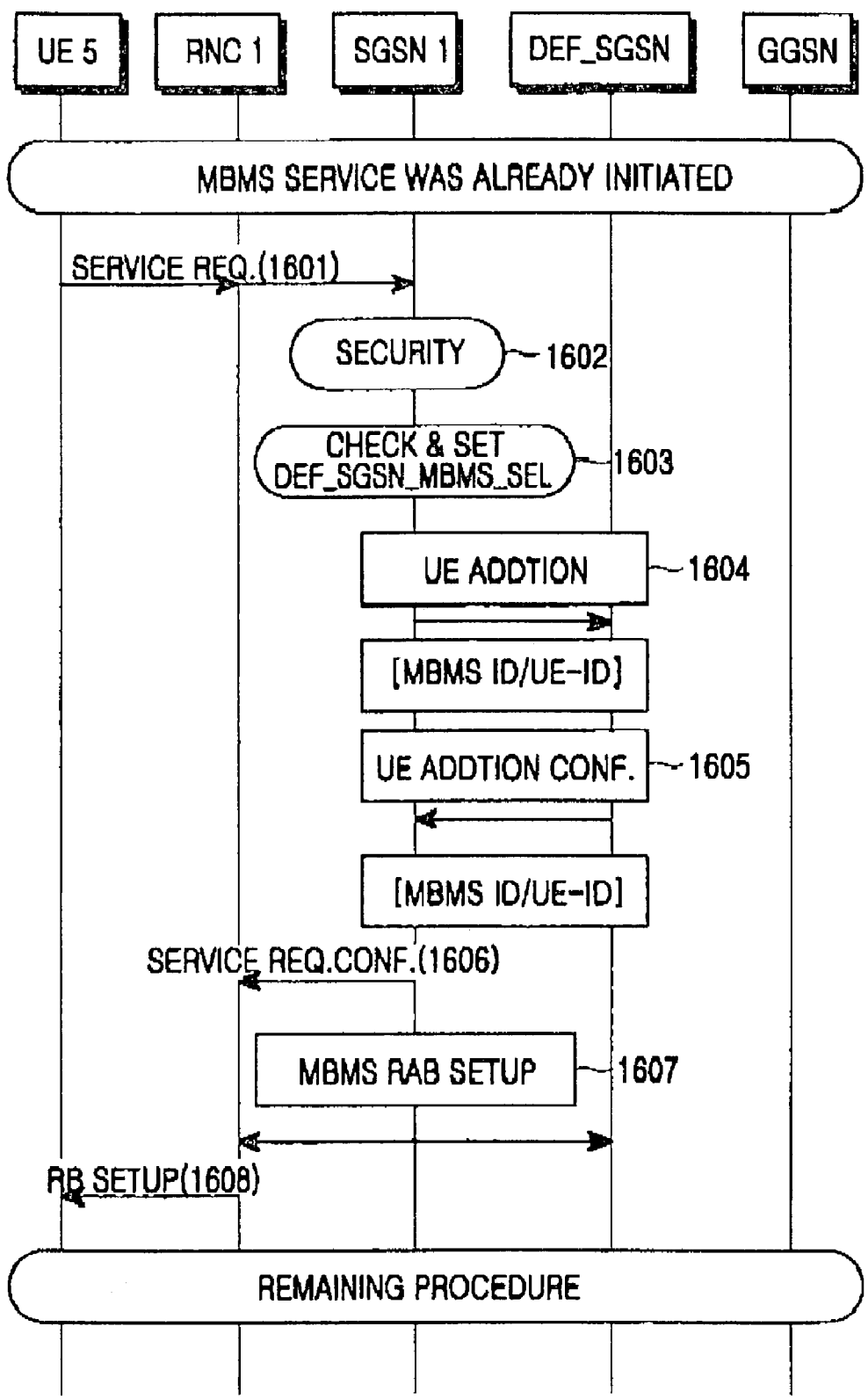
FIG. 16 is a ladder diagram illustrating a signaling procedure performed when a UE selects an MBMS service in a mobile communication system according to another embodiment of the present invention.

FIG. 16 illustrates a channel generation procedure expected when a UE selects an MBMS service that was already initiated in a particular PS pool-area. In this case, all SGSNs jointly managing the same PS pool-area already have information on a default SGSN for a corresponding MBMS service by performing the procedures of FIGS. 13 to 15. Meanwhile, when the Iu-Flex is not applied, a procedure for requesting an already initiated MBMS service is given in FIG. 3. It is assumed in FIG. 16 that a UE #5 belongs to an RNC #1 and an SGSN #1 has assigned P-TMSI. It is also assumed that a default SGSN of an MBMS service requested by the UE #5 is defined as Def_SGSN.

Referring to FIG. 16, in step 1601, a UE #5 selects an already initiated MBMS service, and then sends a service request for the selected MBMS service to an RNC #1. The RNC #1 determines from P-TMSI of the UE #5 that information related to the MBMS service selected by the UE #5 should be transmitted to an SGSN #1, and announces the determination result to the SGSN #1. In step 1602, the SGSN #1 performs an authentication procedure for authentication the UE #5 based on information managed by an HLR. The authentication procedure corresponds to step 305 of FIG. 3. In step 1603, the SGSN #1 checks a value of a parameter Def_SGSN_MBMS_sel related to the MBMS service selected by the UE #5. In this example, a value of the Def_SGSN_MBMS_sel indicates Def_SGSN. In step 1604, the SGSN #1 transmits an identifier of an MBMS service selected by the UE #5 and its own unique identifier to the Def_SGSN, or a default SGSN. In step 1605, the Def_SGSN adds the UE #5 to a list of UEs receiving corresponding MBMS data, and then reports the addition result to the SGSN #1. In step 1606, the SGSN #1 informs the RNC #1 that registration of the UE #5 was successfully completed. This procedure corresponds to step 306 of FIG. 3.

If even the RNC #1 is providing the MBMS service already selected by the UE #5, i.e., if other UEs belonging to the RNC #1 are already receiving the corresponding MBMS service, the RNC #1 can transmit a parameter needed by the UE #5 in receiving MBMS data in step 1608. Step 1607 can be omitted. However, when other RNCs belonging to the same PS pool-area as the RNC #1 are providing the corresponding MBMS service and there is no UE receiving the corresponding MBMS service among UEs belonging to the RNC #1, a procedure of step 1607 for setting up a channel for MBMS data transmission between the Def_SGSN and the RNC #1 is required.

2.3 Ending Procedure of Specific MBMS Service

Figure 17:
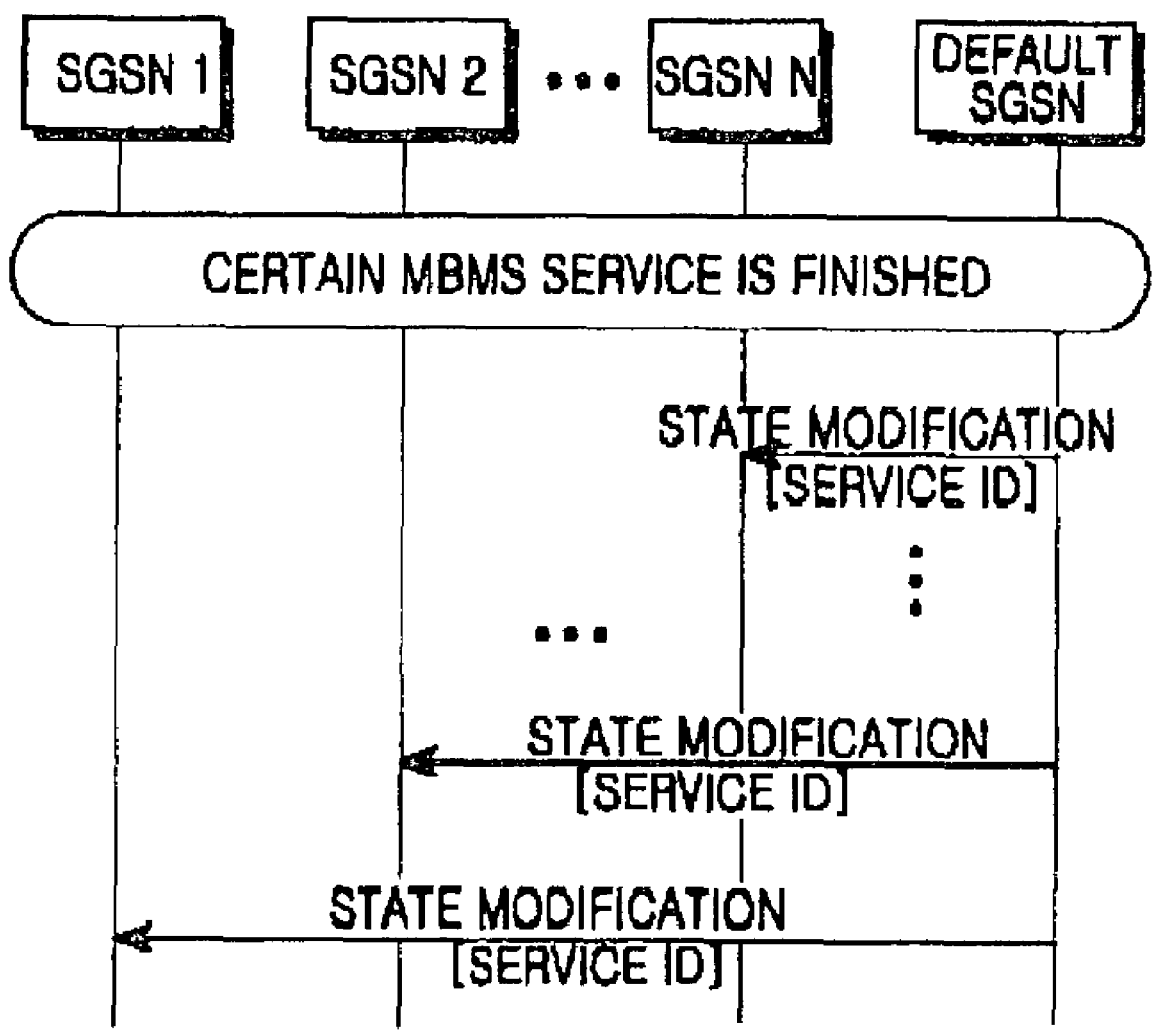
FIG. 17 is a ladder diagram illustrating a signaling procedure for ending an MBMS service currently in service in a mobile communication system with a lu-Flex structure according to another embodiment of the present invention.

FIG. 17 shows that if a specific MBMS service is ended, corresponding default SGSN-related information of Table 2 managed by each SGSN must be deleted. For this purpose, a default SGSN transmits an identifier of the corresponding MBMS service to all SGSNs that jointly manage the same PS pool-area. Upon receiving the MBMS identifier, the SGSNs delete the entire information; illustrated in Table 2, on the corresponding MBMS service, managed by them.

Of course, the above embodiments can be applied even to CS pool-area in the same way. Accordingly, upon receiving a data request, though not an MBMS data request, from UEs belonging to the same pool, the RNC can set up a transmission path through a default SGSN or a default MSC in setting SGSN or MSC, thereby enabling transmission and reception of the data. Although the embodiments have been described with reference to only an example of management by the RNC and the SGSN, the invention can also provide a method for managing an MBMS transmission path between the RNC and the SGSN through an HLR. In addition, a data transmission path can be separately managed according to services, even for a service provided in a fixed network, not an MBMS service.

3. Transmission Procedure of MBMS Data

Figure 19:
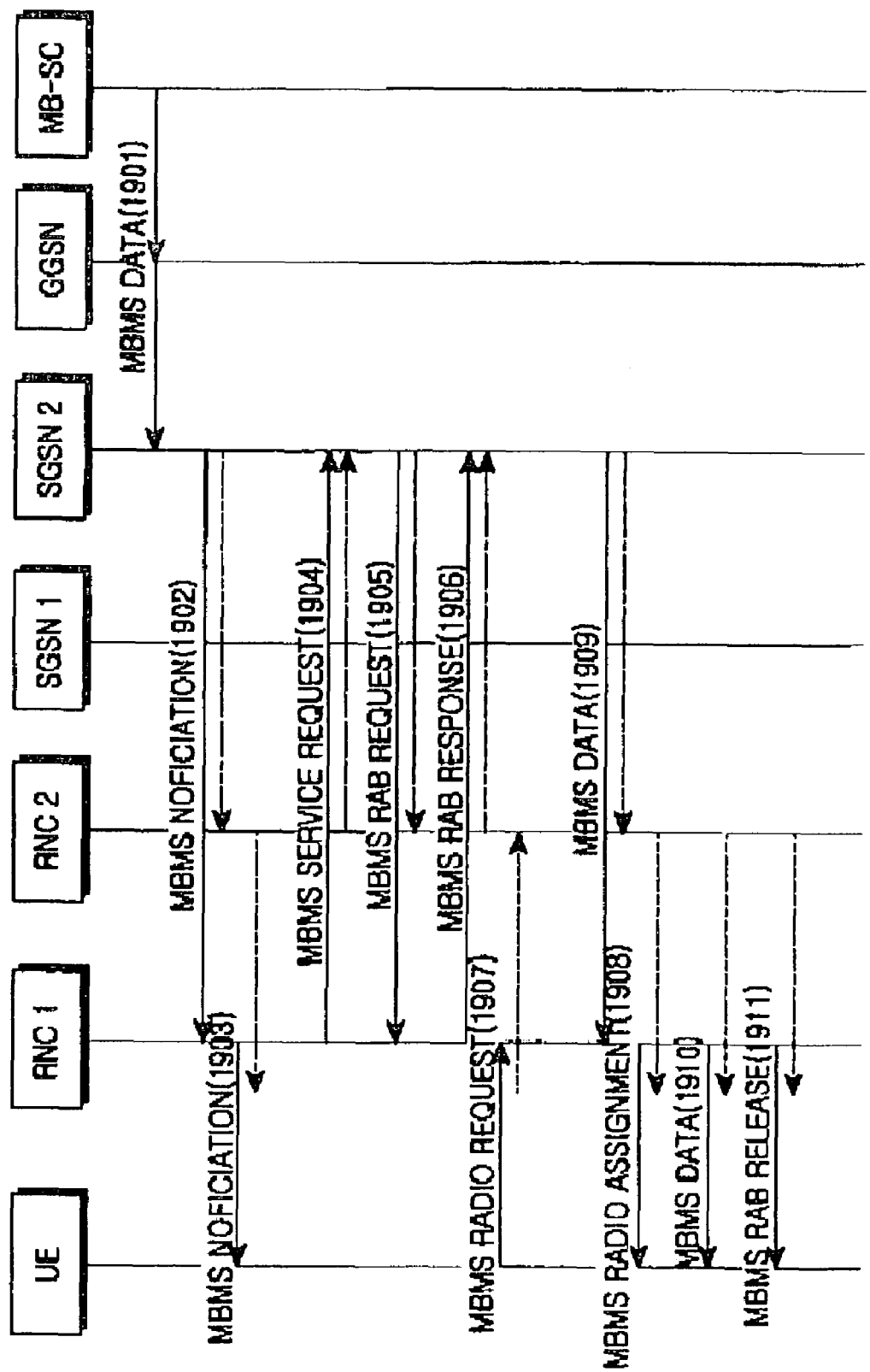
FIG. 19 is a ladder diagram illustrating a signaling procedure for setting up and releasing a data transmission path until an MBMS service is ended after transmission of MBMS data was actually started in a mobile communication system with a lu-Flex structure according to the embodiments of the present invention.

FIG. 19 illustrates a procedure for handling a service which may occur at a time when actual transmission of corresponding MBMS data is started after UEs select a specific MBMS service through processes of FIGS. 7, 13 and 18, and a default SGSN corresponding to the selected MBMS service is designated.

In step 1901, an MB-SC schedules related MBMS data and transmits the scheduled MBMS data to a GGSN. The GGSN transmits again the MBMS data to an SGSN #2, a default SGSN. Upon receiving the MBMS data, the SGSN #2 notifies related RNCs that the MBMS service is actually started in step 1902. In response, each RNC notifies, in step 1903, each UE that the corresponding MBMS service was actually started. Here, the "related RNC" refers to an RNC including UEs that selected the corresponding MBMS service, or all RNCs included in a service area.

In step 1904, the RNC informs the SGSN #2 that it will actually receive MBMS data, through an MBMS Service Request message to the SGSN #2. The RNC and the SGSN #2 set up a channel for transmission of the corresponding MBMS data through steps 1905 and 1906.

If a channel for transmission of the corresponding MBMS data is set up through the steps stated above, the UE that was informed in step 1903 of start of the MBMS service selected by it, informs corresponding RNC that a radio channel for the reception is required in step 1907. In an alternative embodiment, the step 1907 can be performed in advance of the step 1904. In step 1908, each RNC provides the UE with information related to a channel for actually transmitting the corresponding MBMS data to the UE.

The SGSN #2 transmits the corresponding MBMS data to the RNC #1 in step 1909, and the RNC #1 transmits the MBMS data provided from the SGSN #2 to the UE in step 1910. If there is no more MBMS data to transmit, the RNC #1 requests in step 1911 the UE to release a current channel.

As described above, the present invention generates one path between an RNC and an SGSN and one path between one SGSN per PS pool-area and a GGSN for transmission of the same MBMS data, although an MBMS data transmission path is set up in a situation where the concept of Iu-Flex is introduced. By doing so, the invention contributes to an increase in efficiency of wired/wireless resources for supporting an MBMS service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for providing an MBMS (Multimedia Broadcast/Multicast Service) service to user equipments (UEs) requesting the MBMS service, in a code division multiple access (CDMA) mobile communication system, the apparatus comprising:

a plurality of UEs for requesting desired MBMS service, and receiving the MBMS service provided in response to the request;

a plurality of radio network controllers (RNCs) for transmitting data related to the MBSM service to UEs wirelessly connected to thereto among UEs that requested the service; and a plurality of SGSNs (Serving GPRS (General Packet Radio Service) Supporting Nodes) connected to each of the RNCs, for controlling a procedure related to the MBMS service for the UEs that requested the service;

wherein a default SGSN is exclusively designated for at least one separate MBMS service, and the default SGSN transmits MBMS data for the corresponding MBMS service to the UEs that requested the MBMS service, through the RNCs.

2. The apparatus of claim 1, wherein the default SGSN for the MBMS service is designated by an RNC that can be wirelessly connected to a UE that first requested the MBMS service.

3. The apparatus of claim 1, wherein an SGSN that assigned a TMSI (Temporary Mobile Station Identity) to a UE that first requested the MBMS service is designated as the default SGSN for the MBMS service.

4. A method for determining a default SGSN (Serving GPRS (General Packet Radio Service) Supporting Node) for providing an MBMS (Multimedia Broadcast/Multicast Service) service to user equipments (UEs) requesting the MBMS service, in a code division multiple access (CDMA)

mobile communication system having a first group including a plurality of radio network controllers (RNCs), a second group including a plurality of SGSNs connectable to each of the RNCs in the first group, and a plurality of the UEs wirelessly connectable to the RNCs, the method comprising the steps of:

receiving, by one of the RNCs, a service request for the MBMS service;

if default SGSN information corresponding to the MBMS service is not stored in the service request-received RNC, selecting, by the service request-received RNC, one of the SGSNs as a default SGSN; and informing, by the selected default SGSN, all other RNCs except for the service request-received RNC that the MBMS service is managed by the default SGSN.

5. The method of claim 4, wherein the default SGSN is selected considering load distribution of the SGSNs.

6. The method of claim 4, further comprising the step of registering, by the default SGSN, a UE that requested the MBMS service in a list of UEs corresponding to the MBMS service.

7. The method of claim 6, further comprising the step of adding by the default SGSN, if the default SGSN information corresponding to the MBMS service is stored in the service request-received RNC, a UE to the list of UEs corresponding to the MBMS service at the request of an SGSN whose signaling connection with the UE that requested the MBMS service is set up.

8. The method of claim 4, further comprising the step of informing, by the default SGSN, the UEs that the MBMS service is to be initiated, through the RNCs, and then transmitting MBMS data for the MBMS service to the UEs.

9. The method of claim 8, further comprising the step of adding by the default SGSN, if a service request for the MBMS service is received from a new UE during transmission of the MBMS data, the new UE to a list of UEs corresponding to the MBMS service and then setting up a signaling connection with the new UE.

10. The method of claim 4, further comprising the step of requesting by the default SGSN, if the MBMS service is ended, the RNCs to delete the default SGSN information stored therein, and then releasing connection with the RNCs.

11. A method for determining a default SGSN (Serving GPRS (General Packet Radio Service) Supporting Node) for providing an MBMS (Multimedia Broadcast/Multicast Service) service to user equipments (UEs) requesting the MBMS service, in a code division multiple access (CDMA) mobile communication system having a first group including a plurality of radio network controllers (RNCs), a second group including a plurality of SGSNs connectable to each of the RNCs in the first group, and a plurality of the UEs wirelessly connectable to the RNCs, the method comprising the steps of:

receiving, by one of the SGSNs, a service request for the MBMS service;

if default SGSN information corresponding to, the MBMS service is not stored in the service request-received SGSN, selecting, by the service request-received SGSN, itself as a default SGSN; and informing, by the selected default SGSN, other SGSNs that the MBMS service is managed by the default SGSN.

12. The method of claim 11, further comprising the step of registering, by the default SGSN, a UE that requested the MBMS service in a list of UEs corresponding to the MBMS service.

13. The method of claim 12, further comprising the step of requesting by the other SGSNs, if the default SGSN information corresponding to the MBMS service is stored, the default SGSN to add the UE to a list of UEs corresponding to the MBMS service.

14. The method of claim 11, further comprising the step of informing, by the default SGSN, the UEs that the MBMS service is to be initiated, through the RNCs, and then transmitting MBMS data for the MBMS service to the UEs.

15. The method of claim 14, further comprising the step of adding by the default SGSN, if a service request for the MBMS service is received from a new UE during transmission of the MBMS data, the new UE to a list of UEs corresponding to the MBMS service, and then setting up a connection with the new UE.

16. The method of claim 15, further comprising the step of requesting by the default SGSN, if the MBMS service is ended, the other SGSNs to delete the default SGSN information stored therein.

17. A method for providing an MBMS (Multimedia Broadcast/Multicast Service) service through one of a plurality of SGSNs (Serving GPRS (General Packet Radio Service) Supporting Nodes), in a code division multiple access (CDMA) mobile communication system including a plurality of radio network controllers (RNCs), a plurality of the SGSNs connected to each of the RNCs, and a plurality of UEs wirelessly connectable to the RNCs, and providing the MBMS service to the UEs, the method comprising the steps of:

designating, by an RNC that received a service request for the MBMS service, a particular one of the SGSNs as a default SGSN considering a load of each of the SGSNs;

transmitting an identifier for identifying the MBMS service and an identifier for identifying the default SGSN to the default SGSN; and determining by the default SGSN whether the MBMS service is available, and transmitting the identifier for identifying the given MBMS service and the identifier for identifying the default SGSN to other RNCs except for the RNC that received the service request for the given MBMS service.

18. The method of claim 17, further comprising the step of transmitting by the RNC, if a default SGSN corresponding to the MBMS service is already designated, the identifier for identifying the MBMS service and the identifier for identifying the default SGSN to an SGSN whose signaling connection with a UE that requested the MBMS service is set up, and transmitting, by an SGSN whose signaling connection is set up, the identifier for identifying the MBMS service and the identifier for identifying UE requesting the MBMS service to the default SGSN.

19. The method of claim 17, further comprising the step of informing, by the default SGSN, the UEs that the MBMS service is to be initiated, through the RNCs, and then transmitting MBMS data for the MBMS service to the UEs.

20. The method of claim 19, further comprising the step of setting up by the default SGSN, if a service request for the given MBMS service is received from a new UE during transmission of the MBMS data, a connection with the new UE.

21. The method of claim 17, further comprising the step of requesting by the default SGSN, if the MBMS service is ended, the RNCs to delete the default SGSN information stored therein, and then releasing connection with the RNCs.

\* \* \* \* \*